(12) United States Patent
Hovinen et al.

(10) Patent No.: US 9,802,749 B2
(45) Date of Patent: *Oct. 31, 2017

(54) LINER-BASED LIQUID STORAGE AND DISPENSING SYSTEMS WITH EMPTY DETECTION CAPABILITY

(71) Applicant: ENTEGRIS, INC, Billerica, MA (US)

(72) Inventors: Minna Hovinen, Edina, MN (US); John R. Kingery, Eden Prairie, MN (US); Glenn M. Tom, Bloomington, MN (US); Kevin T. O'Dougherty, Arden Hills, MN (US); Kirk Mikkelsen, Chanhassen, MN (US); Donald D. Ware, Woodbury, MN (US); Peter C. Van Buskirk, Newton, CT (US)

(73) Assignee: ENTEGRIS, INC., Billerica, MA (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/688,778

(22) Filed: Apr. 16, 2015

(65) Prior Publication Data
US 2015/0298891 A1 Oct. 22, 2015

Related U.S. Application Data

(63) Continuation of application No. 13/667,182, filed on Nov. 2, 2012, now Pat. No. 9,073,028, which is a
(Continued)

(51) Int. Cl.
*B65D 83/00* (2006.01)
*B01J 4/02* (2006.01)
*G01F 23/18* (2006.01)

(52) U.S. Cl.
CPC ............ *B65D 83/0061* (2013.01); *B01J 4/02* (2013.01); *G01F 23/18* (2013.01);
(Continued)

(58) Field of Classification Search
CPC .... B67D 7/0261; B67D 7/0288; B67D 7/344; B01J 2219/00162; B01J 2219/00164; B01J 4/02
(Continued)

(56) References Cited

U.S. PATENT DOCUMENTS 3,214,054 A   10/1965   Poethig et al.
3,240,399 A   3/1966   Frandeen
(Continued)

FOREIGN PATENT DOCUMENTS

CN   1161250 A   10/1997
CN   1422185 A   6/2003
(Continued)

OTHER PUBLICATIONS

International Search Report and Written Opinion corresponding to International Patent Application No. PCT/US06/15964 dated Sep. 26, 2007.
(Continued)

Primary Examiner — J. Casimer Jacyna

(57) ABSTRACT

Fluid supply systems for storage and dispensing of chemical reagents and compositions, e.g., high purity liquid reagents and chemical mechanical polishing compositions used to manufacture microelectronic device products, having capability for detection of an empty or near-empty condition when the contained liquid is at or approaching depletion during dispensing operation. Fluid delivery systems employing empty detect arrangements are described, including pressure transducer monitoring of dispensed material intermediate the supply package and a servo-hydraulic dispense pump, or monitoring of dispenser chamber replenishment times in a dispenser being replenished on a cyclic schedule to flow material from the dispenser to a downstream tool utilizing the dispensed material.

12 Claims, 14 Drawing Sheets

Related U.S. Application Data continuation of application No. 11/912,613, filed as application No. PCT/US2006/015964 on Apr. 25, 2006, now Pat. No. 8,322,571.

(60) Provisional application No. 60/674,579, filed on Apr. 25, 2005.

(52) U.S. Cl.
CPC ............ *B01J 2219/00065* (2013.01); *B01J 2219/00067* (2013.01); *B01J 2219/00069* (2013.01); *B01J 2219/00164* (2013.01)

(58) Field of Classification Search
USPC ........ 222/65, 94, 95, 105, 386.5, 394, 400.7
See application file for complete search history.

(56) References Cited

U.S. PATENT DOCUMENTS

| | | |
|---|---|---|
| 3,756,367 A | 9/1973 | Mitchell et al. |
| 3,756,459 A | 9/1973 | Bannister et al. |
| 4,696,840 A | 9/1987 | McCullough et al. |
| 4,871,087 A | 10/1989 | Johnson |
| 5,035,339 A | 7/1991 | Meyersburg |
| 5,049,349 A | 9/1991 | McCullough et al. |
| 5,129,415 A | 7/1992 | Runyon et al. |
| 5,148,945 A | 9/1992 | Geatz |
| 5,335,821 A | 8/1994 | Osgar |
| 5,370,269 A | 12/1994 | Bernosky et al. |
| 5,425,404 A | 6/1995 | Dyer |
| 5,526,956 A | 6/1996 | Osgar |
| 5,555,996 A | 9/1996 | Lang-Ree et al. |
| 5,570,815 A | 11/1996 | Ramsay |
| 5,693,017 A | 12/1997 | Spears et al. |
| 5,711,354 A | 1/1998 | Siegele et al. |
| 5,750,216 A | 5/1998 | Horino et al. |
| 5,799,830 A | 9/1998 | Carroll et al. |
| 5,861,060 A | 1/1999 | Maugans et al. |
| 5,868,278 A | 2/1999 | Chen |
| 5,878,793 A | 3/1999 | Siegele et al. |
| 5,919,360 A | 7/1999 | Contaxis, III |
| 5,968,014 A | 10/1999 | Neftel et al. |
| 5,988,422 A | 11/1999 | Vallot |
| 6,015,068 A | 1/2000 | Osgar et al. |
| 6,021,921 A | 2/2000 | Lan et al. |
| 6,040,776 A | 3/2000 | Glover et al. |
| 6,067,906 A * | 5/2000 | Ryan ................ B41F 31/02 101/335 |
| 6,077,356 A | 6/2000 | Bouchard |
| 6,168,048 B1 | 1/2001 | Xu et al. |
| 6,199,599 B1 | 3/2001 | Gregg et al. |
| 6,206,240 B1 | 3/2001 | Osgar et al. |
| 6,237,809 B1 | 5/2001 | Kawai et al. |
| 6,267,132 B1 | 7/2001 | Guarneri |
| 6,319,317 B1 | 11/2001 | Takamori |
| 6,360,546 B1 | 3/2002 | Wang et al. |
| 6,406,276 B1 | 6/2002 | Normand et al. |
| 6,460,404 B1 | 10/2002 | Chan et al. |
| 6,460,730 B1 | 10/2002 | Liedtke |
| 6,499,617 B1 | 12/2002 | Niedospial, Jr. et al. |
| 6,581,802 B1 | 6/2003 | Sperber |
| 6,604,555 B2 | 8/2003 | Blatt et al. |
| 6,648,201 B1 | 11/2003 | Marinaro et al. |
| 6,698,619 B2 | 3/2004 | Wertenberger |
| 6,786,714 B2 | 9/2004 | Haskew |
| 6,789,699 B2 | 9/2004 | Clark et al. |
| 6,843,285 B2 | 1/2005 | Ozawa |
| 6,848,599 B2 | 2/2005 | Hammarth et al. |
| 6,942,123 B2 | 9/2005 | Wertenberger |
| 6,942,127 B2 | 9/2005 | Raats |
| 7,114,517 B2 * | 10/2006 | Sund ................ G01F 1/8413 137/486 |
| 7,124,913 B2 | 10/2006 | Birtcher |
| 7,172,096 B2 | 2/2007 | O'Dougherty |
| 7,188,644 B2 | 3/2007 | Kelly et al. |
| 7,204,950 B2 | 4/2007 | Farha et al. |
| 7,316,329 B2 | 1/2008 | Wertenberger |
| 7,654,414 B2 * | 2/2010 | Hiranaga ................ B67D 1/10 222/52 |
| RE43,288 E | 4/2012 | Sund et al. |
| 8,322,571 B2 | 12/2012 | Hovinen et al. |
| 2002/0007849 A1 | 1/2002 | Wang et al. |
| 2002/0014275 A1 | 2/2002 | Blatt et al. |
| 2003/0075566 A1 | 4/2003 | Priebe et al. |
| 2003/0080142 A1 | 5/2003 | Meheen |
| 2003/0138358 A1 | 7/2003 | Eipel et al. |
| 2003/0205285 A1 | 11/2003 | Kelly et al. |
| 2003/0205581 A1 | 11/2003 | Wertenberger |
| 2004/0011826 A1 | 1/2004 | Stradella |
| 2004/0058453 A1 | 3/2004 | Free et al. |
| 2004/0069347 A1 | 4/2004 | Graves et al. |
| 2005/0087237 A1 | 4/2005 | O'Dougherty et al. |
| 2005/0224523 A1 | 10/2005 | O'Dougherty |
| 2005/0279207 A1 | 12/2005 | O'Dougherty |
| 2006/0037968 A1 | 2/2006 | Brenner |
| 2006/0138177 A1 * | 6/2006 | Wauters ................ B67D 1/0462 222/386.5 |
| 2006/0163292 A1 | 7/2006 | Wauters et al. |
| 2007/0180993 A1 | 8/2007 | Byun et al. |
| 2008/0298727 A1 | 12/2008 | Edgington et al. |
| 2009/0020176 A1 | 1/2009 | Hasegawa et al. |
| 2010/0112815 A1 | 5/2010 | O'Dougherty et al. |
| 2010/0133292 A1 | 6/2010 | Ware et al. |
| 2011/0187028 A1 | 8/2011 | Menning et al. |

FOREIGN PATENT DOCUMENTS

| | | |
|---|---|---|
| CN | 1617828 | 5/2005 |
| EP | 0138718 | 4/1985 |
| EP | 0138718 | 9/1987 |
| EP | 0971165 | 1/2000 |
| EP | 1001265 | 5/2000 |
| EP | 2148771 B1 | 2/2010 |
| FR | 2902083 A1 | 12/2007 |
| GB | 2172261 | 9/1986 |
| JP | 2006/100087 A | 4/1984 |
| JP | 60-013659 A | 1/1985 |
| JP | 60-139799 U | 9/1985 |
| JP | S6238232 A | 2/1987 |
| JP | 63252538 | 10/1988 |
| JP | 01 162352 | 6/1989 |
| JP | 05-319500 | 5/1992 |
| JP | 05128383 A | 5/1993 |
| JP | 05253461 | 10/1993 |
| JP | 05319500 | 12/1993 |
| JP | 06135471 | 5/1994 |
| JP | 06-247499 A | 9/1994 |
| JP | 07-315388 A | 12/1995 |
| JP | 08313324 A | 11/1996 |
| JP | 09026350 A | 1/1997 |
| JP | 09-104481 | 4/1997 |
| JP | 2009/183493 | 7/1997 |
| JP | 10189438 | 7/1998 |
| JP | 10-211451 | 8/1998 |
| JP | 2000/015082 | 1/2000 |
| JP | 2000/109195 A | 4/2000 |
| JP | 2004/140066 | 5/2004 |
| JP | 2004/534170 A | 11/2004 |
| JP | 2005/010196 A | 1/2005 |
| JP | 2005/507835 | 3/2005 |
| JP | 2007/204102 | 8/2007 |
| KR | 0136644 B1 | 1/1998 |
| KR | 2001/0066624 A | 7/2001 |
| KR | 10/0385555 | 5/2003 |
| KR | 10/0438101 | 6/2004 |
| KR | 0742282 | 7/2007 |
| KR | 101297004 | 8/2013 |
| TW | 442429 B | 6/2001 |
| TW | 445172 B | 7/2001 |
| TW | 496942 | 8/2002 |
| WO | WO 92/16304 | 10/1992 |
| WO | WO 00/00767 | 1/1996 |
| WO | WO 96/01226 | 1/1996 |

(56) References Cited

FOREIGN PATENT DOCUMENTS

| WO | WO 99/04060 | 1/1999 |
|----|----|----|
| WO | WO 00/00767 | 1/2000 |
| WO | WO 01/38835 | 5/2001 |
| WO | WO 03/014380 | 2/2003 |
| WO | WO 03/066509 | 8/2003 |
| WO | WO 03/066509 A2 | 8/2003 |
| WO | WO 2004/050537 A2 | 6/2004 |
| WO | WO 2004/058425 | 7/2004 |
| WO | WO 2007/088661 | 8/2007 |

OTHER PUBLICATIONS

"Notification of Reasons for Refusal" from related JP Patent Application No. 2015-084211, mailed Dec. 2, 2016, 4 pages.
"Notification of Reasons for Refusal" from related JP Patent Application No. 2015-084212, mailed Dec. 2, 2016, 4 pages.

* cited by examiner

LINER-BASED LIQUID STORAGE AND DISPENSING SYSTEMS WITH EMPTY DETECTION CAPABILITY

CROSS-REFERENCE TO RELATED APPLICATIONS

This application is a continuation of U.S. patent application Ser. No. 13/667,182, filed Nov. 2, 2012, which is a continuation of U.S. patent application Ser. No. 11/912,613, filed Sep. 3, 2009, now U.S. Pat. No. 8,322,571, issued Dec. 4, 2012, which is a U.S. national phase under 35 U.S.C. §371 of International Patent Application No. PCT/US2006/015964, filed Apr. 25, 2006, which claims benefit of U.S. Provisional Patent Application No. 60/674,579, filed Apr. 25, 2005.

Related subject matter is also disclosed in U.S. Provisional Patent Application No. 60/674,578 filed Apr. 25, 2005 and U.S. Provisional Application 60/761,608 filed on Jan. 24, 2006 (with the subject matter of the foregoing two provisional applications embodied in U.S. patent application Ser. No. 11/912,629, which was published as U.S. Patent Application Publication No. 2009/0212071 A1 on Aug. 27, 2009) and relates to U.S. Provisional Patent Application 60/674,577 filed on Apr. 25, 2005 (with the subject matter of the foregoing provisional application embodied in U.S. patent application Ser. No. 11/912,653 filed on Dec. 1, 2010). The disclosures of the foregoing applications and publications are hereby incorporated herein by reference in their respective entireties.

FIELD OF THE DISCLOSURE

The present invention relates to liner-based liquid containment systems for storage and dispensing of chemical reagents and compositions, e.g., high purity liquid reagents and chemical mechanical polishing compositions used in the manufacture of microelectronic device products, having capability for empty detection when the contained liquid is at or approaching depletion during dispensing operation.

DESCRIPTION OF THE RELATED ART

In many industrial applications, chemical reagents and compositions are required to be supplied in a high purity state, and specialized packaging has been developed to ensure that the supplied material is maintained in a pure and suitable form, throughout the package fill, storage, transport, and ultimate dispensing operations.

In the field of microelectronic device manufacturing, the need for suitable packaging is particularly compelling for a wide variety of liquids and liquid-containing compositions, since any contaminants in the packaged material, and/or any ingress of environmental contaminants to the contained material in the package, can adversely affect the microelectronic device products that are manufactured with such liquids or liquid-containing compositions, rendering the microelectronic device products deficient or even useless for their intended use.

As a result of these considerations, many types of high-purity packaging have been developed for liquids and liquid-containing compositions used in microelectronic device manufacturing, such as photoresists, etchants, chemical vapor deposition reagents, solvents, wafer and tool cleaning formulations, chemical mechanical polishing compositions, etc.

One type of high-purity packaging that has come into such usage includes a rigid outer pack containing a liquid or liquid-based composition in a flexible liner or bag that is secured in position in the rigid outer pack by retaining structure such as a lid or cover. Such packaging is commonly referred to as "bag-in-box" packaging. The rigid outer pack of the packaging may for example be formed of a high-density polyethylene or other polymer or metal, and the liner may be provided as a pre-cleaned, sterile collapsible bag of a polymeric film material, such as polytetrafluoroethylene (PTFE), low-density polyethylene, PTFE-based multilaminates, polyurethane, or the like, selected to be inert to the contained liquid or liquid-based material to be contained in the liner. Packaging of such type is commercially available under the trademark NOWPAK from ATMI, Inc. (Danbury, Conn., USA).

In the dispensing operation involving such liner packaging of liquids and liquid-based compositions, the liquid is dispensed from the liner by connecting a dispensing assembly including a dip tube to a port of the liner, with the dip tube immersed in the contained liquid. After the dispensing assembly has been thus coupled to the liner, fluid pressure is applied on the exterior surface of the liner, so that it progressively collapses and forces liquid through the dispensing assembly for discharge to associated flow circuitry for flow to an end-use site.

It has been established that the provision of a minimal, and preferably zero, head space in the liner package is advantageous in order to suppress generation of particles and microbubbles in the liquid or liquid-based composition.

Additionally, in the storage and dispensing of liquids and liquid-based compositions from liner packages, it is desirable to manage the dispensing operation so that the depletion or approach to depletion of the dispensed material is detected so that termination of a downstream operation, or switchover to a fresh package of material, is able to be timely effected. Reliability in end-stage monitoring of the dispensing operation, and particularly in detection of an empty or approaching empty condition, therefore enables optimum utilization of liner packages, and is a desired objective for design and implementation of such packaging.

SUMMARY OF THE DISCLOSURE

The present invention relates to packaging apparatus and process for the storage and dispensing of liquids and liquid-based compositions.

In one aspect, the invention relates to a fluid storage and dispensing system, comprising:
a vessel having an interior volume;
a liner in said interior volume, arranged to contain a liquid medium in a zero or near-zero head space conformation;
a dispensing assembly adapted for engagement with the vessel, to withdraw liquid medium from the liner during dispensing operation; and
an integrated flowmeter arranged to monitor the liquid medium withdrawn from the liner during dispensing operation, and to generate an output correlative of an empty or near-empty condition upon occurrence of same.

In another aspect, the invention relates to a liner package dispensing system, comprising:
a vessel having an interior volume;
a liner in said interior volume, arranged to contain a liquid medium in a zero or near-zero head space conformation;
a dispensing assembly adapted for engagement with the vessel, to withdraw (or deliver) liquid medium from the liner during dispensing operation;

flow circuitry coupled with the dispensing assembly and arranged for flow therethrough of liquid medium during the dispensing operation;

such flow circuitry including an in-line portion and an optional branch portion;

a secondary volume of liquid medium arranged for dispensing so that dispensing of the secondary volume does not occur until a primary volume of liquid medium has been fully dispensed, wherein such primary volume includes at least part of the liquid medium in the liner, and the secondary volume is constituted by one or more of:

(i) a part of the liquid medium in the liner other than liquid medium constituting the primary volume, when the primary volume comprises less than all liquid medium in the liner;

(ii) an in-line volume of liquid medium in or communicating with the in-line portion of the flow circuitry; and (iii) a branch volume of liquid medium in or communicating with the branch portion of the flow circuitry; and an empty detector arranged to monitor said dispensing operation and generate an empty detect output due to an empty or near-empty condition when said secondary volume dispensing is initiated after the primary volume of liquid medium has been dispensed.

A further aspect of the invention relates to a liner package dispensing system, comprising:

a vessel having an interior volume;

a liner in said interior volume, arranged to contain a liquid medium overlaid by a head space;

a reservoir barometrically coupled in fluid communication with the head space and liquid medium in the liner, and arranged to contain liquid medium overlaid by gas to define a liquid level in the reservoir; and an empty detector arranged to monitor liquid level in the reservoir and generate an empty detect output when liquid level in the reservoir changes due to an empty or near-empty condition of the liner.

Another aspect of the invention relates to a liner package dispensing system, comprising:

a vessel having an interior volume;

a liner in the interior volume, arranged to contain a liquid medium overlaid by a head space;

a phase separator;

a dispense line coupling the liner in fluid communication with the phase separator;

a liquid medium flow line coupled with the phase separator to discharge liquid medium therefrom;

a reservoir positioned above the phase separator, arranged to contain liquid medium defining a liquid medium level in the reservoir;

an overhead line joining the phase separator in fluid flow communication with the reservoir;

a first level sensor arranged to detect a first liquid medium level in the reservoir at which the reservoir contains a predetermined amount of reserve liquid medium;

a second level sensor in said overhead line, arranged to detect a second liquid medium level in the overhead line during dispensing of said reserve liquid medium;

a first flow control valve in said overhead line, between said second level sensor and said reservoir, arranged to be open for filling of the reservoir during dispensing of liquid medium from the liner, and to close upon detection of the first liquid medium level by the first level sensor;

a pressure detection actuator in the dispense line, operatively arranged to detect an empty or near-empty condition of the liner subsequent to closure of the first flow control valve in the overhead line, and upon detection of the empty or near-empty condition of the liner to open the first flow control valve for dispensing of the reserve liquid medium through the phase separator and liquid medium flow line.

A further aspect of the invention relates to a liner package dispensing system, comprising:

a vessel having an interior volume;

a liner in the interior volume, arranged to contain a liquid medium overlaid by a head space;

a reservoir, arranged to contain liquid medium defining a liquid medium level in the reservoir;

a dispense line coupling the liner in fluid communication with the reservoir;

a liquid medium flow line coupled with the reservoir to discharge liquid medium therefrom;

a first level sensor arranged to detect a first liquid medium level in the reservoir;

a second level sensor arranged to detect a second liquid medium level in the reservoir, wherein said second medium level in the reservoir is higher than the first medium level in the reservoir;

a gas communication line coupling the reservoir to (i) an ambient environment of the reservoir by a vent line joining the gas communication line in fluid communication with the ambient environment, and, optionally, (ii) a source of pressurization gas, operatively arranged for pressure-assisted dispensing of reserve liquid medium from the reservoir, by a pressurization line joining the gas communication line in fluid communication with the source of pressurization gas, the vent line having a first fluid communication control valve therein, and second pressurization line having a second fluid communication flow control valve therein, wherein the first fluid communication control valve is operatively coupled with the second level sensor to be open and accommodate filling of the reservoir to the second liquid medium level, and to close when the second liquid medium level has been reached, for subsequent dispensing of liquid medium from the liner though the dispense line and reservoir to the liquid medium flow line, in dispensing operation; and a pressure detection actuator in the dispense line, operatively arranged to detect an empty or near-empty condition of the liner, and upon detection of said empty or near-empty condition of the liner to open one of the first and second fluid communication control valves for continued dispensing of liquid medium from the reservoir after the empty condition has been detected.

A further aspect of the invention relates to a liner package dispensing system, comprising:

a vessel having a first interior volume;

a first liner in said first interior volume, arranged to contain a first volume of liquid medium overlaid by a first head space;

a venting path adapted to vent head space gas from the first head space;

an empty detect reservoir having a second interior volume;

a second liner in the second interior volume, arranged to contain a second volume of the liquid medium overlaid by a second head space;

a source of pressurizing gas;

a first conduit coupled to the source of pressurizing gas and arranged to flow pressurizing gas into the vessel to exert pressure on the first liner therein;

a dispensing assembly adapted for engagement with the vessel, to dispense liquid medium from the first liner when pressure is exerted on the first liner by the pressurizing gas source during dispensing operation;

a second conduit interconnecting the dispensing assembly and the empty detect reservoir, to deliver dispensed liquid medium to the empty detect reservoir;

a third conduit coupled to a same or different source of pressurizing gas and arranged to flow pressurizing gas into the empty detect reservoir to exert pressure on the second liner therein;

a second vent conduit communicating with the second interior volume of the empty detect reservoir and arranged to vent head space gas from the second head space;

a fourth conduit coupled in dispensing communication with the second liner in the empty detect reservoir and arranged to discharge liquid medium therefrom;

a first flow control valve in said first conduit;

a second flow control valve in said first vent conduit;

a third flow control valve in said second conduit;

a fourth flow control valve in said second vent conduit;

a fifth flow control valve in said third conduit;

a sixth flow control valve in said fourth conduit;

a first level indicator arranged to detect presence of liquid medium in said first vent conduit;

a second level indicator arranged to detect presence of liquid medium in said second vent conduit;

a third level indicator arranged to detect presence of liquid medium in the second liner; and a controller arranged to conduct a dispensing operation including the steps of:

opening the first and second flow control valves to vent gas from the first head space;

flowing pressurizing gas into the vessel to exert pressure on the first liner, to effect pressure dispensing of liquid medium;

closing the second flow control valve when the first level indicator senses presence of liquid medium in the first vent conduit;

opening the third and fourth flow control valves to flow liquid medium from the first liner through the dispensing assembly and second conduit to the second liner in the empty detect reservoir, and to vent the second head space through the second vent conduit;

closing the fourth flow control valve when the second level indicator senses presence of liquid medium in the second vent conduit;

opening the fifth flow control valve;

flowing pressurizing gas into the empty detect reservoir to exert a predetermined pressure on the second liner that is less than pressure exerted on the first liner;

opening the sixth flow control valve and dispensing liquid medium from the second liner to the fourth conduit until pressure in the second liner decreases due to an empty or near-empty condition in the first liner;

closing the third and first flow control valves when the third level indicator detects a liquid medium level in said second liner indicative of the empty or near-empty condition; and after occurrence of the empty or near-empty condition in the first liner, continuing dispensing of liquid medium from the second liner.

A still further aspect of the invention relates to a liner package dispensing system, comprising:

a vessel having an interior volume;

a liner in the interior volume, arranged to contain a liquid medium;

a dispensing assembly adapted for engagement with the vessel, to withdraw liquid medium from the liner during dispensing operation; and a sensor arranged to detect a dispensing-related condition, and to generate a correlative output indicative of the condition.

In another aspect, the invention relates to a fluid storage and dispensing method, comprising:

providing a vessel having an interior volume and a liner in the interior volume, containing a liquid medium in a zero or near-zero head space conformation;

dispensing liquid medium from the liner; and monitoring the liquid medium withdrawn from the liner during dispensing with an integrated flowmeter, and generating an output from the integrated flowmeter that is correlative of an empty or near-empty condition upon occurrence of same.

Another aspect of the invention relates to a system for manufacturing microelectronic devices including one or more of the containers of the invention and one or more subsystems for applying materials contained in such containers to such microelectronic devices.

A further aspect of the invention relates to a method of making a product containing a microelectronic device comprising applying one or more materials from one or more of the containers to the microelectronic device and incorporating such device into such product.

Yet another aspect of the invention relates to improved microelectronic devices made using the containers of the invention and having reduced defects.

Additional aspects of the invention relate to fluid dispensing systems and methods of types corresponding to those illustratively identified above, but lacking the liner feature described above.

A further aspect of the invention relates to a material dispensing system including a material storage and dispensing package containing a liner therein, adapted to hold a material for pressure-dispensing thereof, wherein the package is coupled by a dispense line to a dispensed material-utilizing tool, and the dispense line has operatively disposed therein a servo-hydraulic dispense pump, and an empty detect pressure transducer between the package and the pump operatively arranged to provide an output indicative of approach to an empty state of the package.

Yet another aspect of the invention relates to a material dispensing system including a material storage and dispensing package containing a liner therein, adapted to hold a material for pressure-dispensing thereof, wherein the package is coupled by a dispense line to a dispensed material-utilizing tool, and the dispense line is coupled to a dispenser arranged to receive resist on a cyclic replenishment schedule from said package, for flow to the tool, and a monitor adapted to detect an increase in time required for replenishment of the dispenser indicative of approach to an empty state of the package and to responsively provide an output of said approach.

In another aspect, the invention relates to a method of supplying material, comprising delivery of said material by pressure dispensing same from a liner in a material storage and dispensing package to a material-utilizing tool, said delivery including pumping of material from the package to the tool, and monitoring pressure of the dispensed material upstream of the pump to determine occurrence of a progressively increasingly rapid decline of pressure thereof, as indicative of onset of exhaustion of material in the package.

In still another aspect, the invention relates to a method of supplying material, comprising delivery of said material by pressure dispensing same from a liner in a material storage and dispensing package to a material-utilizing tool, said delivery including flow of material from the package to a dispenser arranged to receive resist on a cyclic replenishment schedule from said package, for flow to the tool, monitoring replenishment time for the cup, and responsively generating an output upon detection of a progressively more rapid increase of time required for replenishment of the dispenser, as indicative of onset of exhaustion of material in the package.

In a further aspect, the invention relates to a pressure-dispense system, comprising a vessel enclosing an interior volume, a liner disposed in the interior volume and adapted to hold material therein for pressure dispensing, and a pressure assembly adapted to apply exterior fluid pressure on the liner for the pressure dispensing, wherein the pressure-dispense system includes a secondary volume for said material, with such secondary volume constituting a sub-volume of the liner having a different pressurizing requirement than that required for pressure-dispensing of material from a main volume of the liner not including such sub-volume. The pressure assembly includes a fluid pressurizing drive train adapted to deliver pressurized fluid into the interior volume to apply pressure on the liner, during dispensing of material from the main volume and during dispensing of material from the secondary volume, that maintains dispensed material at a same pressure throughout the dispensing from the main volume and the secondary volume.

Another aspect of the invention relates to a microelectronic product manufacturing apparatus, comprising a pressure-dispense system as described above, and a microelectronic product manufacturing tool, coupled with the pressure-dispense system to receive said dispensed material therefrom.

Still another aspect of the invention relates to a method of supplying a material, comprising: providing a pressure-dispense system as described above; actuating the pressure assembly for dispensing; dispensing material from the main volume of the liner; and thereafter dispensing material from the secondary volume of the liner; wherein material is dispensed at a same pressure throughout the dispensing from the main volume of the liner and dispensing from the secondary volume of the liner.

A further aspect of the invention relates to a method of manufacturing a microelectronic product, comprising supplying such material by a method as described above, and utilizing material from such dispensing in a microelectronic product manufacturing process.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
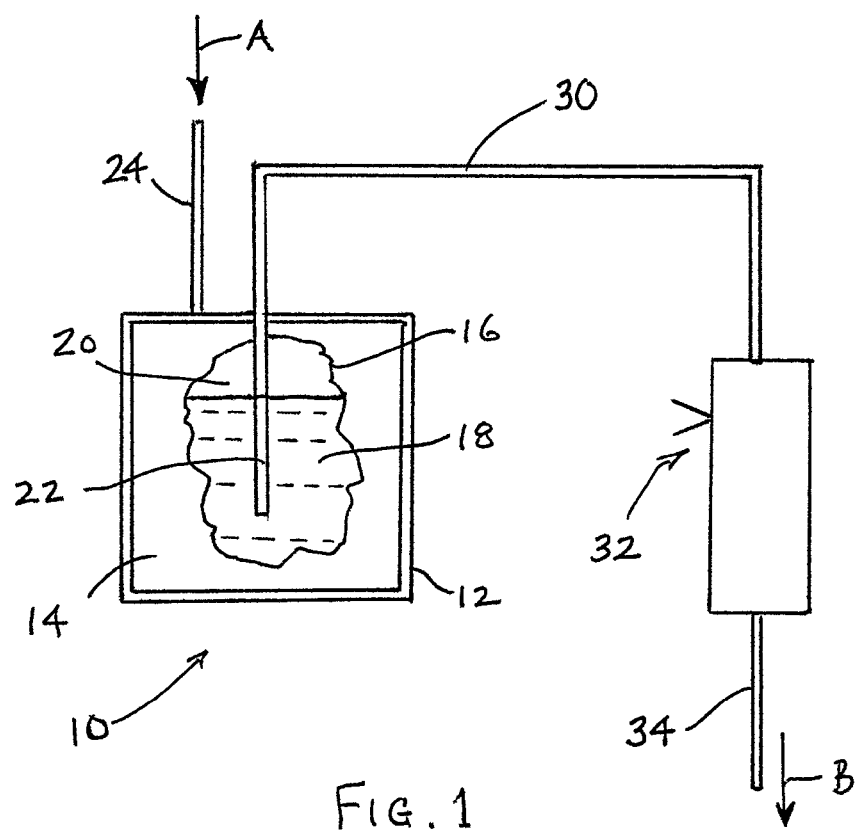
FIG. 1 is a schematic representation of a liner package dispensing system with an empty detect sensor arranged to monitor the liquid medium dispensing operation.

The present invention relates to liquid containment systems for storage and dispensing of chemical reagents and compositions of widely varied character. Although the invention is hereafter described primarily with reference to storage and dispensing of liquid or liquid-containing compositions for use in the manufacture of microelectronic device products, it will be appreciated that the utility of the invention is not thus limited, but rather the invention extends to and encompasses a wide variety of other applications and contained materials.

Although the invention is discussed hereinafter with reference to specific embodiments including various liner-based packages and containers, it will be appreciated that various embodiments, e.g., as directed to pressure-dispense arrangements or other features of the invention, may be practiced in liner-less package and container systems.

The present invention relates in various aspects to liquid containment systems for storage and dispensing of chemical reagents and compositions, e.g., high purity liquid reagents and chemical mechanical polishing compositions used in the manufacture of microelectronic device products, having capability for empty detection when the contained liquid is at or approaching depletion during dispensing operation.

The term "microelectronic device" as used herein refers to resist-coated semiconductor substrates, flat-panel displays, thin-film recording heads, microelectromechanical systems (MEMS), and other advanced microelectronic components. The microelectronic device may include patterned and/or blanketed silicon wafers, flat-panel display substrates or polymer, e.g., fluoropolymer substrates. Further, the microelectronic device may include mesoporous or microporous inorganic solids.

In liner packaging of liquids and liquid-containing compositions (hereafter referred to as liquid media), it is desirable to minimize the head space of the liquid medium in the liner. The head space is the volume of gas overlying the liquid medium in the liner.

The liner-based liquid media containment systems of the present invention have particular utility in application to liquid media used in the manufacture of microelectronic device products. Additionally, such systems have utility in numerous other applications, including medical and pharmaceutical products, building and construction materials, food products, etc., where liquid media or liquid materials require packaging.

As used herein, the term "zero head space" in reference to fluid in a liner means that the liner is totally filled with liquid medium, and that there is no volume of gas overlying liquid medium in the liner.

Correspondingly, the term "near zero head space" as used herein in reference to fluid in a liner means that the liner is substantially completely filled with liquid medium except for a very small volume of gas overlying liquid medium in the liner, e.g., the volume of gas is less than 5% of the total volume of fluid in the liner, preferably being less than 3% of the total volume of fluid, more preferably less than 2% of the total volume of fluid and most preferably, being less than 1% of the total volume of fluid (or, expressed another way, the volume of liquid in the liner is greater than 95% of the total volume of the liner, preferably being more than 97% of such total volume, more preferably more than 98% of such total volume, and most preferably more than 99% of such total volume).

The greater the volume of the head space, the greater the likelihood that the overlying gas will become entrained and/or solubilized in the liquid medium, since the liquid medium will be subjected to sloshing, splashing and translation in the liner, as well as impact of the liner against the rigid surrounding container during transportation of the package. This circumstance will in turn result in the formation of bubbles, microbubbles, and particulates in the liquid medium, which degrade the liquid medium, and render it potentially unsuitable for its intended purpose. For this reason, head space is desired to be minimized and preferably eliminated (i.e., in a zero or near-zero head space conformation) with complete filling of the interior volume of the liner with liquid medium.

In instances where head space is present in the liner, and a dip tube coupled with a dispense head is used as a dispensing assembly engageable with the liner package, the end of the dispensing operation is readily determinable by the entrance of gas bubble(s) to the dip tube, indicating that the liquid medium in the liner is depleted and only the remaining gas originally overlying the liquid medium is able to flow through the dip tube and remainder of the dispensing assembly.

Where zero or near-zero head space conformations are employed, however, it is not possible to utilize such ingress of gas into the dip tube to detect an empty or near-empty condition.

As used herein, the term "empty" in reference to liquid medium in a liner or other vessel, means that the liner or other vessel is fully depleted of liquid medium therein. The term "near-empty" as used herein, in reference to liquid medium in a liner or other vessel, means that the liner or other vessel is substantially completely depleted of liquid medium therein, e.g., the volume of liquid medium remaining in the liner or other vessel is less than 5% of the total volume of the liner or other vessel, preferably being less than 3% by volume, more preferably less than 2% by volume, and most preferably less than 1% by volume, of the total volume of the liner or other vessel. The terms "empty detect" and "empty detection" refer to the detecting of an empty or near-empty condition in a liner or vessel, and the term "empty detector" refers to an apparatus that is employed for determination of such condition. It will be appreciated that the proximity to total depletion of the liquid medium that is able to be sensed by such detectors will in practice vary depending on the specific apparatus employed and its sensitivity, calibration, etc., and that one of skill in the art can readily determine an appropriate detector for a given liquid medium dispensing system without undue effort, based on the disclosure herein.

There is significant diminution of flow toward the end of the dispensing operation in zero or near-zero head space packages, as the liquid medium in the liner approaches depletion. For example, in an exemplary commercial 4-liter bag-in-box liner package containing polyethyleneglycol methyl ether acetate (PGMEA), a 20% reduction in flow rate of the liquid is measurable at the 99% dispense point, in relation to the flow rate during earlier stages of the dispense operation.

The present invention in one aspect takes advantage of such diminution of flow rate at the approach to liquid medium depletion in zero or near-zero head space conformations of liner packages, to detect empty or near-empty conditions, by flowing the dispensed liquid medium through an integrated flowmeter. Integrated flowmeters thus can be used to monitor the liquid dispensing rate, and to provide an output indicative of the diminution of the flow rate at the approach to empty condition, so that the depleted liner package is taken off dispensing operation in favor of a fresh package containing liquid medium for continued dispensing at the desired flow rate. Such integrated flowmeter usage thus resolves a potential flow rate problem in applications in which any reduction in the set point flow rate is not acceptable.

Integrated flowmeters are commercially available, and a suitable type of such flowmeter is readily determinable within the skill of the art based on the disclosure herein. In one embodiment, the integrated flowmeter is an electronic output integrated flowmeter, providing an empty-detect output signal that can be processed by associated monitoring and control equipment. For example, the liner package may be accessorized with an RFID tag, e.g., on the liner itself, or on the rigid overpack within which the liner is reposed. The RFID tag may include an RF antenna for communication of information from the tag to a process controller querying the tag. The electronic output integrated flowmeter arranged to monitor the dispensed liquid medium flow rate can therefore feed an empty-detect signal to the RFID tag on the package, so that the process controller receives a corresponding empty warning signal correlative of the depletion or approach to depletion of the liquid medium from the liner package, and automatic switchover to a new package is effected, or the dispensing operation is otherwise terminated from the exhausted package.

Alternatively, the electronic output integrated flowmeter could be arranged to send a control signal correlative of approach to depletion of the liquid medium directly to the process controller for the same purpose.

FIG. 1 is a schematic representation of an illustrative liner package dispensing system with an empty detect sensor arranged to monitor the liquid medium dispensing operation.

The liner package dispensing system as illustrated includes a liner package 10 including a rigid overpack 12 defining an interior volume 14 in which is disposed a flexible, collapsible liner 16 holding liquid medium 18.

Overlying the liquid medium 18 is a head space 20 comprising gas. Joined to the overpack 12, in fluid communication with the interior volume 14 therein, is a pressurizing gas feed tube 24. The gas feed tube 24 is in turn coupled to a source of pressurizing gas (source not shown in FIG. 1), by which pressurizing gas is flowed into the gas feed tube 24 in the direction indicated by arrow A.

The introduced gas from gas feed tube 24 enters the interior volume 14 and exerts pressure on the exterior surface of the liner 16, to thereby effect collapsing of the liner and pressure dispensing of the liquid medium 18 therefrom.

The dispensing of the liquid medium 18 is facilitated by the dip tube 22 extending into the rigid overpack 12 and the liner 16 (e.g., through a port structure of the liner, not shown for ease of description in FIG. 1). The dip tube 22 is open at its lower end, and liquid medium 18 from the (interior of the) liner flows under the impetus of the applied pressure of the pressurizing gas on the liner, through dip tube 22, and flow line 30, connected to the dip tube, to the liquid medium discharge line 34 containing empty detect sensor 32 therein. Liquid medium is discharged from the discharge line 34 in the direction indicated by arrow B.

In lieu of the introduction to the interior volume 14 of the pressurizing gas, external pressure can be applied to the liner by hydraulic or mechanical means, to effect dispensing of the liquid medium from the liner.

As dispensing of the liquid medium proceeds, the liner 16 progressively collapses, until the liquid is depleted. At this juncture, gas from the head space 20 in the liner, and gas, rather than liquid medium, flows through the dip tube 22, flow line 30 and liquid medium discharge line 34. The passage of gas rather than liquid medium through the empty detect sensor 32 triggers the detection of the empty or near-empty condition of the liner by such sensor.

Such empty detect sensor can operate by various modalities to detect the ingress of gas into the liquid medium dispensing flow circuitry. For example, the empty detect sensor can employ optical sensing of the fluid passing through an inline transparent tube or reservoir of suitable material, e.g., a fluoroplastic polymer, such as a polymer of tetrafluoroethylene and perfluorovinylether (PFA), or alternatively a capacitive electrical effect in a sensor arrangement including such PFA tube or reservoir.

Although the foregoing arrangement for empty detect operation is effective for determining when the liner has become exhausted of liquid, it relies on the presence of gas in a head space overlying the liquid medium in the liner. Where the liner is fully filled with the liquid medium in a zero head space conformation, there is no gas to determine the end point of liquid medium supply from the liner.

Figure 2:
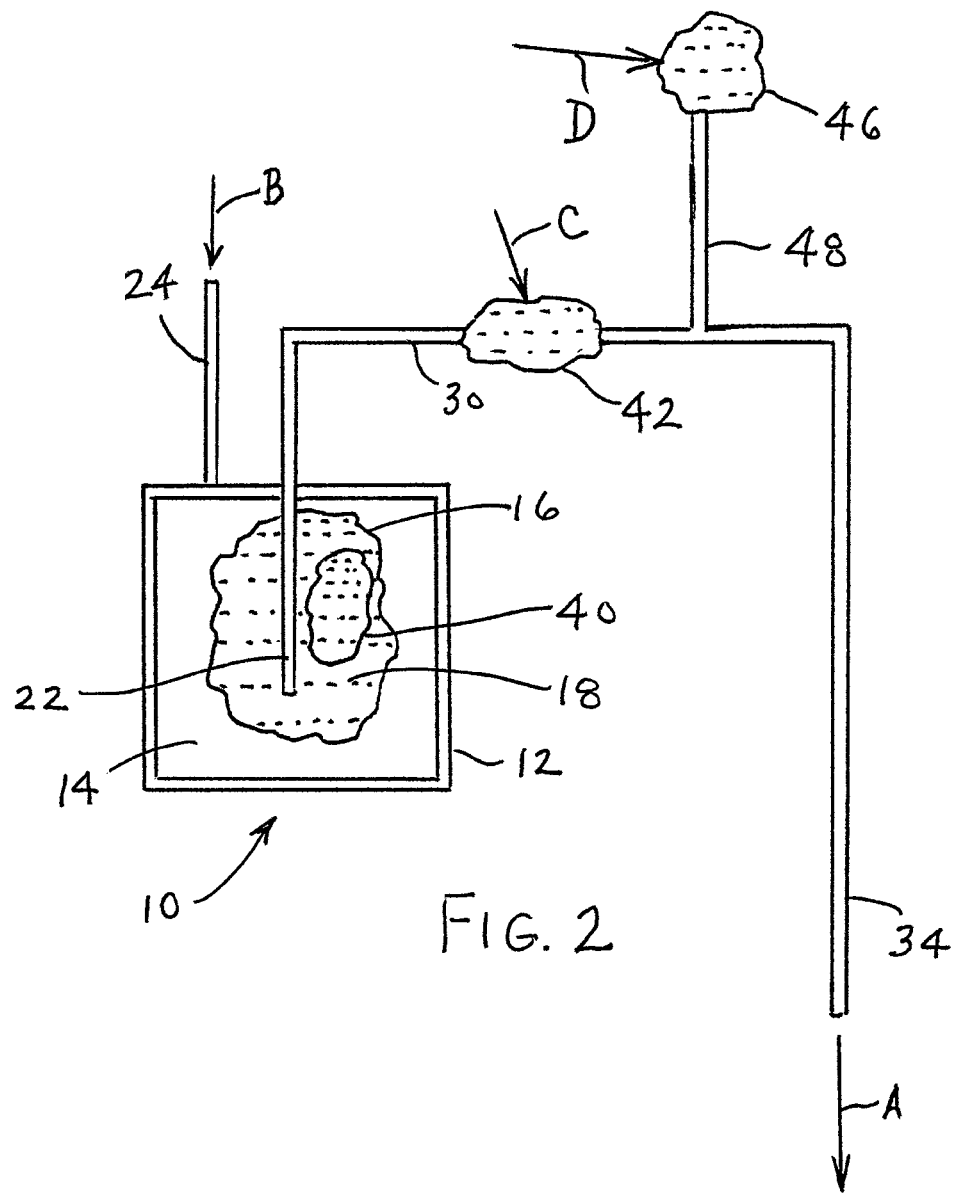
FIG. 2 is a schematic representation of a liner package dispensing system with primary and secondary volumes of liquid medium arranged so that dispensing of the secondary volume does not occur until the primary volume of liquid medium has been fully exhausted, and with the dispensing of secondary volume liquid medium triggering an empty detect sensor arranged to monitor the liquid medium dispensing operation.

FIG. 2 is a schematic representation of a zero or near-zero head space liner package dispensing system with primary and secondary volumes of liquid medium arranged so that dispensing of the secondary volume does not occur until the primary volume of liquid medium has been fully exhausted, and with the dispensing of secondary volume liquid medium triggering an empty detect sensor arranged to monitor the liquid medium dispensing operation.

As illustrated in FIG. 2, the liner package dispensing system as illustrated includes a liner package 10 including a rigid overpack 12 defining an interior volume 14 in which is disposed a flexible, collapsible liner 16 holding liquid medium 18. There is no head space in the liner, but the liner includes, in addition to a primary volume of liquid medium therein, a secondary volume illustrated schematically as being within the solid line 40. The secondary volume of liquid medium is the same type of liquid medium as in the primary volume in the liner, the only difference being that the secondary volume is arranged so that it is not accessed until the dispensing of the primary volume of the liquid medium is completed. The secondary volume may be a partitioned space in the liner that is internal to the primary volume in the liner.

Alternatively, the secondary volume may be disposed in-line in flow line 30, shown schematically as secondary volume 42, or the secondary volume may be branched from the flow line 30, as shown by the secondary volume 46 being disposed in tee-line 48. The in-line secondary volume 42 is preferred to the branched secondary volume 46, due to the difficulties of turning over and purging the dead end such that fresh lot liquid medium is supplied to the downstream process. The internal secondary volume 40 is most preferred and has the advantage that it requires reduced dispense train components and lower cost than the provision of secondary volumes 42 and/or 46, and the internal secondary volume 40 provides fresh secondary volume of high purity liquid medium each cycle.

In the FIG. 2 system, joined to the overpack 12, in fluid communication with the interior volume 14 therein, is a pressurizing gas feed tube 24. The gas feed tube 24 is in turn coupled to a source of pressurizing gas (source not shown in FIG. 2), by which pressurizing gas is flowed into the gas feed tube 24 in the direction indicated by arrow B.

The introduced gas from gas feed tube 24 enters the interior volume 14 and exerts pressure on the exterior surface of the liner 16, to thereby effect collapsing of the liner and pressure dispensing of the liquid medium 18 therefrom.

The dispensing of the liquid medium 18 is facilitated by the dip tube 22 extending into the rigid overpack 12 and the liner 16 (e.g., through a port structure of the liner, not shown for ease of description in FIG. 2). The dip tube 22 is open at its lower end, and liquid medium 18 from the liner flows under the impetus of the applied pressure of the pressurizing gas on the liner, through dip tube 22, and flow line 30, connected to the dip tube, to the liquid medium discharge line 34. Liquid medium is discharged from the discharge line 34 in the direction indicated by arrow A.

The inline exterior secondary volume 42 is disposed in, or in communication with, flow line 30 and is shown as having compressive force being exerted thereon, schematically depicted by arrow C. The branched secondary volume 46 is in, or in communication with, the tee-line 48, e.g., coupled to the extremity of such branch line, and is shown as having compressive force being exerted thereon, schematically depicted by arrow D.

If the secondary volume of liquid medium is partitioned internally of the liner in relation to the primary volume of liquid medium in the liner, the force exerted on the liner 16 by the pressurizing gas introduced in gas feed line 24 is adequate to effect dispensing of the internal secondary volume liquid medium. However, if the secondary volume is external of the liner package, in a corresponding secondary volume liner, the secondary volume liner must have additional compressive force exerted thereon, such as by separate application of a pressurizing gas, or by hydraulic or mechanical application of compressive force thereon.

The design and implementation of the secondary volumes must ensure that the secondary volumes do not begin collapsing until the primary volume of liquid medium is completely exhausted. This can be accomplished, for example, by making the secondary volume collapsing force greater than the primary volume collapsing force. The collapsing force on the secondary volume of liquid medium can be applied in a "push" (active compressive force on the secondary volume of liquid medium) or "pull" (extraction or drawing of liquid medium from the secondary volume, e.g., by use of a downstream pump, venturi, or the like) manner.

The secondary volume of liquid medium can be contained in a liner of polymeric film similar to the liner containing the primary volume of liquid medium, or the secondary volume of liquid medium may be contained in a restricted region by bellows, diaphragms or collapsing tubes, or by other suitable structure ensuring that the primary volume of liquid medium is first exhausted before any secondary volume liquid medium is dispensed. The specific arrangement of secondary volume restriction is readily determinable based on the disclosure herein, and considerations of cost, flow-through effectiveness, occurrence of dead zones in the flow path, etc.

As the primary volume of liquid medium is completely exhausted during the dispensing operation, the secondary volume of liquid medium assumes responsibility for supplying liquid medium to the downstream process or other locus of use of the dispensed liquid medium. Upon this changeover, from the inventory of primary volume liquid medium to the secondary volume of the liquid medium, the empty-detect detector in the dispensing system must detect this change.

In general, the detection of the beginning of the secondary volume dispensing can be detected in any suitable manner, by a detector disposed in the flow path (not shown in FIG. 2) or otherwise arranged to effect the detection. Illustrative examples of useful detection schemes include, without limitation: a pressure transducer arranged to detect pressure decay in the flow of primary volume liquid medium to the downstream point of use; a load change associated with the use of "push" and "pull" elements in the system, as the increased load of dispensing the more restricted secondary volume of liquid medium is detected; flow measurement, if the secondary volume is disposed in a branched tee-line; and/or measurement of the displacement of the secondary volume of liquid medium. Specific devices that can be used in such detection schemes variously include: electronic pressure transducers; thermal or other flow sensors; current load monitors; capacitive, inductive, Hall effect, or optic displacement elements; etc.

In one specific embodiment, the secondary volume of liquid medium may be provided in a second liner package with an independent and lower compressive force requirement for the pressurizing gas used to dispense the secondary volume liquid medium, in contrast to the compressive force required to effect dispensing of liquid medium from the primary volume of liquid medium in a first liner package.

In one specific embodiment, the liner package utilizes a flexible member that is welded to the liner, in which the flexible member is stiffer in character than the liner film of which the liner is constructed. The flexible member is configured such that it forms a restricted sub-volume of the liquid medium within the liner, e.g., as a packet structure in the interior volume of the liner, which flexes to release the liquid medium in the packet. The flexible member thereby creates a small pressure drop, e.g., of 1-3 psig magnitude, but functions to dispense a fairly well-defined amount of the liquid medium.

A pressure transducer or pump torque (measured by amperage drawn by the pump) then can be employed to detect the pressure drop in the liquid medium dispense line. If the liner package itself is used as the pump, by the imposition of pressure on the exterior surface of the liner to compress and collapse the liner and force liquid medium to be expelled from the liner, then the flexible member in the liner will cause an increase in the drive train pressure that is required to maintain the dispense line pressure.

In other words, the amount of the compressive force exerted on the liner by a drive train, e.g., compression gas delivery flow circuitry, which may for example include an air compressor, or a fluid pump applying gas compression on the liner, will need to increase in order to overcome the additional incremental pressure drop that is associated with the flexible member, when the liner otherwise becomes empty, in order to maintain the same pressure (as during earlier dispensing from the bulk volume of liquid medium in the liner) in the dispense line that is coupled to the package.

An empty detect alarm can be actuated in response to the change in differential pressure between the drive train pressure and the dispense line pressure that occurs when the bulk liquid medium is exhausted from the interior volume of the liner, and the drive train pressure then is increased to maintain the desired pressure and flow rate of dispensed liquid medium from the restricted sub-volume defined by the flexible member.

The flexible member defining the restricted sub-volume in the interior volume of the liner can be of any suitable form. In one embodiment, the flexible member is provided as a "V"-shaped sheet element that is welded, e.g., by ultrasonic welding, solvent welding or in other suitable manner, to an edge (bottom, side or top edge) of the liner, with each side of the "V"-shaped sheet element welded to each side of the liner. In another embodiment, the flexible member is provided in the form of a flat or slightly curved rectangular member that is welded to a flat section of the liner. In still another embodiment, the flexible member is configured as a disc-shaped member that is welded to a flat portion of the liner, e.g., a portion near the middle of the liner.

Thus, the invention contemplates a pressure-dispense system, comprising a vessel enclosing an interior volume, a liner disposed in the interior volume and adapted to hold material therein for pressure dispensing, and a pressure assembly adapted to apply exterior fluid pressure on the liner for the pressure dispensing, wherein the pressure-dispense system includes a secondary volume for said material, with such secondary volume constituting a sub-volume of the liner having a different pressurizing requirement than that required for pressure-dispensing of material from a main volume of the liner not including such sub-volume. The pressure assembly includes a fluid pressurizing drive train adapted to deliver pressurized fluid into the interior volume to apply pressure on the liner, during dispensing of material from the main volume and during dispensing of material from the secondary volume, that maintains dispensed material at a same pressure throughout the dispensing from the main volume and the secondary volume.

The fluid pressurizing drive train includes, in one embodiment, flow circuitry including an air compressor or fluid pump adapted to maintain a same pressure throughout the dispensing from the main volume and the secondary volume.

The liner in use contains a material of appropriate character for the intended application, e.g., a material for manufacturing a microelectronic product. The pressure-dispense system described above can be provided as a part of a microelectronic product manufacturing apparatus, in combination with a microelectronic product manufacturing tool that is coupled with the pressure-dispense system to receive the dispensed material therefrom.

The pressure-dispense system described above can be used in a method of supplying a material, in which the pressure assembly is actuated, followed by dispensing material first from the main volume of the liner, and thereafter from the secondary volume of the liner, with the material being dispensed at a same pressure throughout the dispensing from the main volume of the liner and dispensing from the secondary volume of the liner. The dispensed material may for example comprise a material for manufacturing a microelectronic product, whereby the material may be dispensed as described, and utilized in a microelectronic product manufacturing process.

In another embodiment, an empty detect system for a liner package includes a modified barometer to provide a reservoir for liquid utilized for wafer processing in microelectronic device manufacturing operations. In such arrangement, the liner package has head space in the liner, from which head space gas can be extracted to provide a minimum head space in the liner package. The head space, having a volume that may for example be on the order of 100-150 milliliters, is vented to a reservoir vessel for level detection, to provide capability for sensing of the empty-detect condition of the liner package when the liquid medium inventory in the liner has reached, or is approaching, a depleted state.

Figure 3:
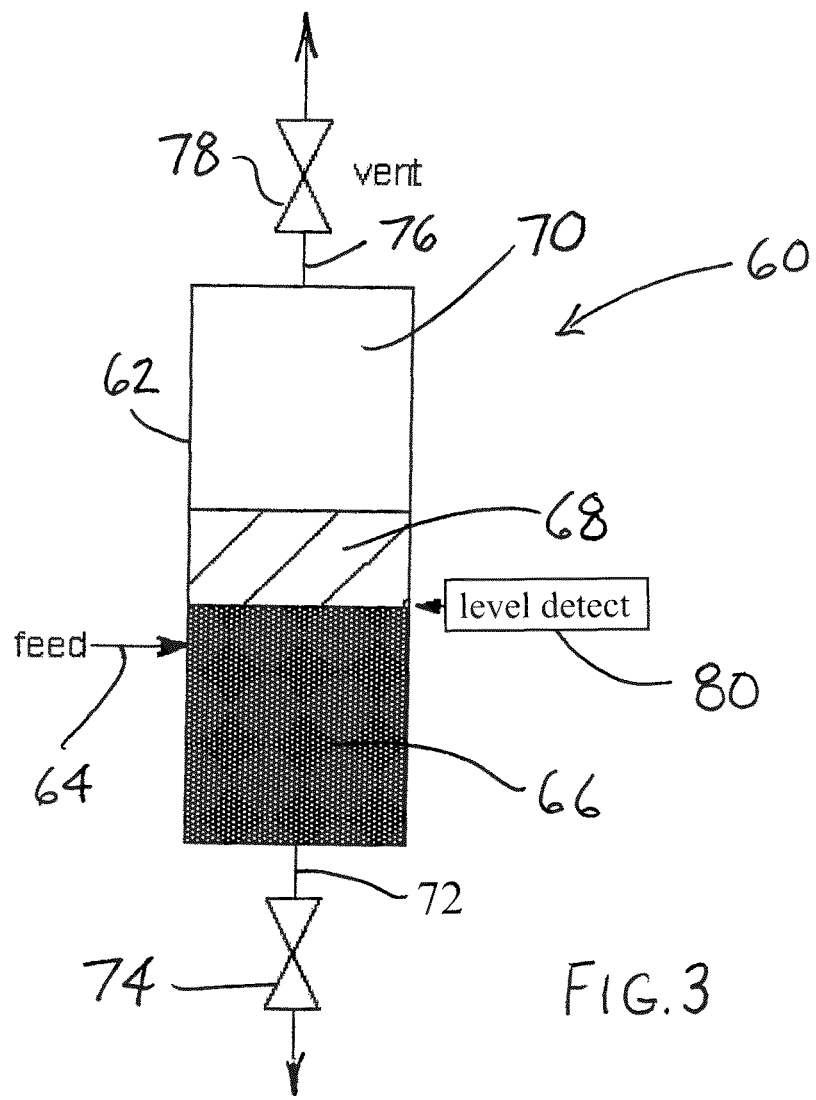
FIGS. 3-5 are alternative reservoir assemblies useful for empty detect monitoring of liner packages during dispensing operation.
Figure 4:
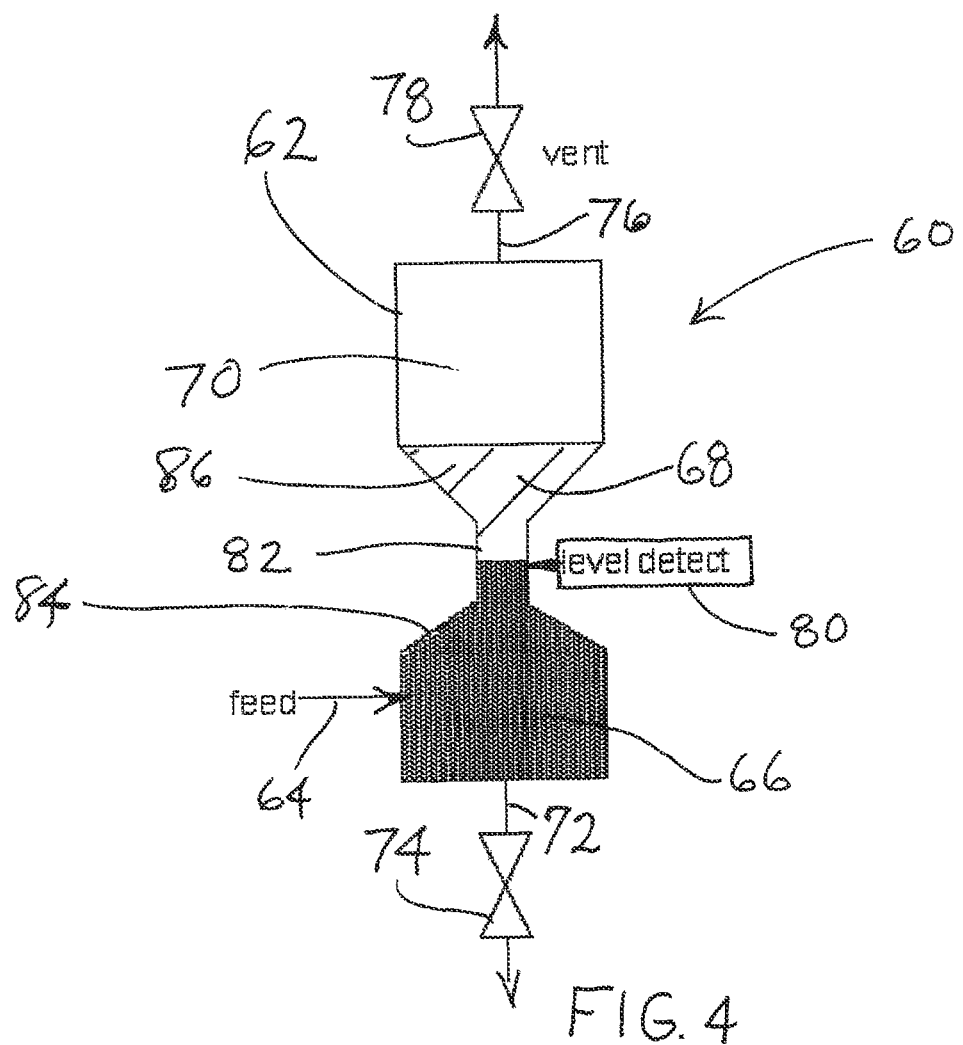
Figure 5:
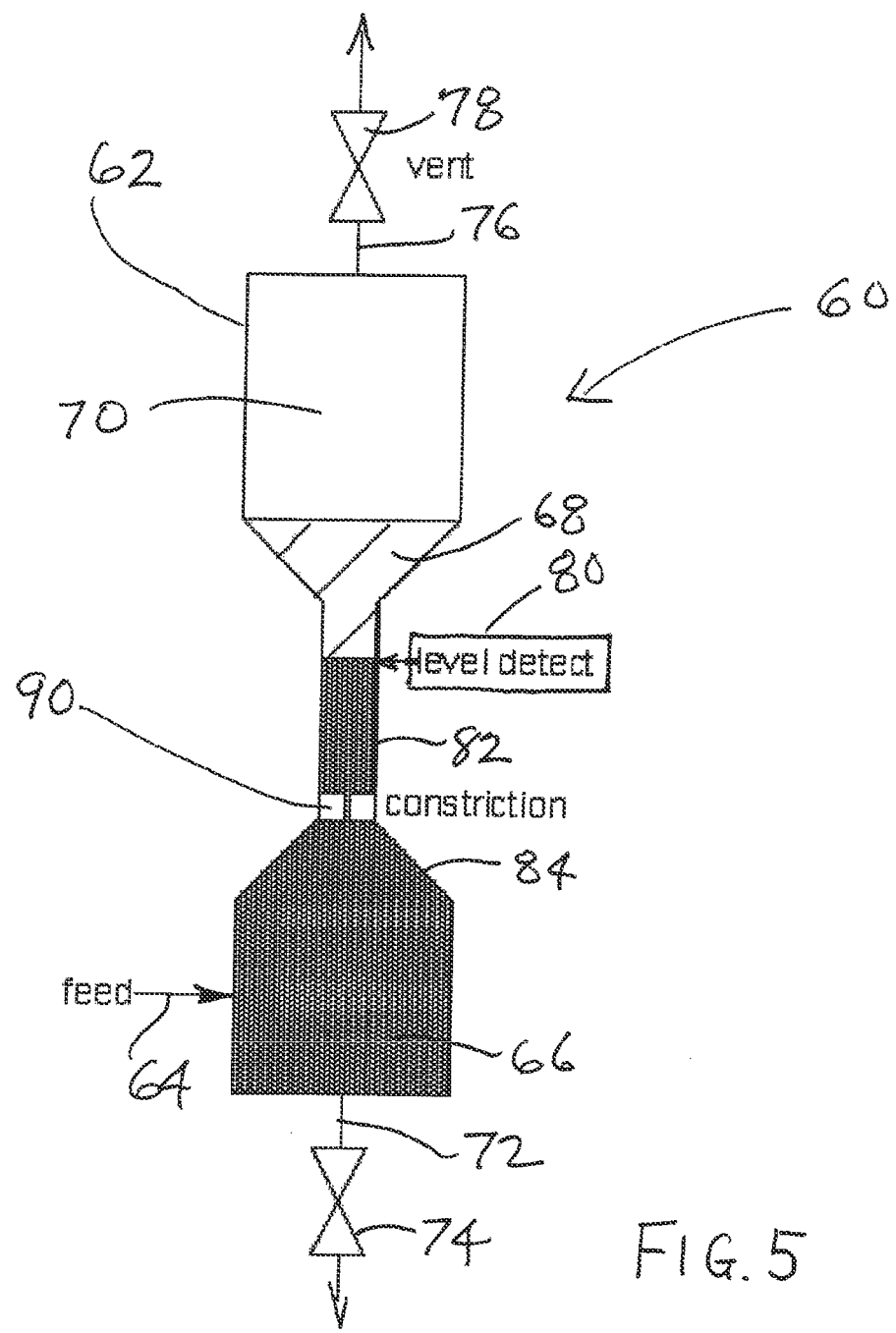

The reservoir used in such empty detect systems can be of any suitable type, such as one of the alternative forms shown in FIGS. 3-5, wherein corresponding parts and features are numbered correspondingly in the respective drawings.

Referring to FIG. 3, the reservoir system 60 is arranged to receive liquid medium from the liner package in feed line 64, entering the reservoir 62 to form therein a liquid medium volume 66, with excess gas from the feed line 64 forming the gas space 70 from which the excess gas may be vented off, in vent line 76 containing a flow control valve 78 therein.

From the reservoir, the liquid medium from volume 66 may be discharged in line 72 containing flow control valve 74 therein, and passed to the downstream use facility or location, e.g., a microelectronic device manufacturing facility.

For monitoring for the occurrence of an empty or near-empty condition, the vent valve 78 and the liquid medium flow valve 74 are closed, and dispense pressure is applied to the exterior surface of the liner in the liner package, to cause head space gas from the liner to be forced to the top region of the reservoir 62. When the liquid medium has been fully expelled from the liner, the gas in the top region of the reservoir 62 is under pressure and can effect pressure dispensing of the liquid medium from the reservoir to the downstream process to complete the feeding of the liquid medium without cessation of flow.

During the dispensing of the liquid medium from the reservoir to the downstream process, another fresh liner package containing an inventory of liquid medium can be coupled to the flow circuitry in the liquid medium dispensing system, or otherwise be "changed in" for renewed liner package dispensing.

The amount of the liquid medium that is dispensed from the reservoir 62 during the "running dry" of the liner package is indicated as the cross-hatched volume 68 in FIG. 3. As this make-up amount of liquid medium (volume 68) is dispensed to the downstream process, the falling level of such liquid medium will be detected by level detect unit 80. The level detect unit 80 may incorporate level sensor elements of any suitable type, e.g., infrared level sensors or capacitive sensors, and the empty or near-empty condition sensed by the detect unit 80 may cause the detect unit to actuate a suitable alarm, send a control signal to an auto-changeover system for switch-in of a new liner package for dispensing, or take other appropriate action.

The reservoir system of FIG. 3 is deployed in the process flow line and functions both as a surge tank or hold-up vessel that supplies liquid medium when the liner package has been depleted of material to be dispensed, as well as a level detect installation that serves to provide appropriate warning or corrective action even when head space is present in the liner of the liner package.

In the FIG. 4 reservoir system, the structure of the reservoir is the same as that shown in FIG. 3, except that the reservoir at its intermediate portion has a reduced diameter section 82 for level detect sensing, with the reduced diameter section being flanked by the frustoconical transition sections 84 and 86 as illustrated.

The detection system 60 shown in FIG. 5 is of the same conformation as the detection system in FIG. 4, except that the reduced diameter section 82 is of an elongated character in relation to the length of such section in the detection system of FIG. 4, and the reduced diameter section 82 in the FIG. 5 system has a flow restriction 90 at its lower end, as shown.

The three reservoir empty detect systems of FIGS. 3-5 are designed to minimize the incorporation of dissolved gases in the liquid medium being dispensed, since any dissolved gases can later appear as bubbles. The empty detect systems of FIGS. 4 and 5 have a reduced diameter intermediate section 82 to limit the diffusion of gases into the liquid medium being dispensed. The system of FIG. 5 demonstrates the provision of a longer barrier to gas incorporation (i.e., the system of FIG. 5 provides a long path for disengagement of gas from the liquid medium). As another variant, the reservoir could be formed as an upper gas section and a lower liquid section, interconnected by a long coil of tubing to provide good isolation between the respective gas and liquid sections of the reservoir.

The FIG. 5 reservoir provides a trap for extraneous bubbles that may be expelled by the liner after the initial discharge of the head space gas from the liner package. If bubbles were to rise up through the reduced diameter intermediate section of the reservoir, such bubble movement could result in significant convective mixing of the reservoir, which would hasten the uptake of gas by the liquid medium. During the initial transfer of head space gas, the increasing pressure will force the gas up to the top section of the reservoir.

Figure 6:
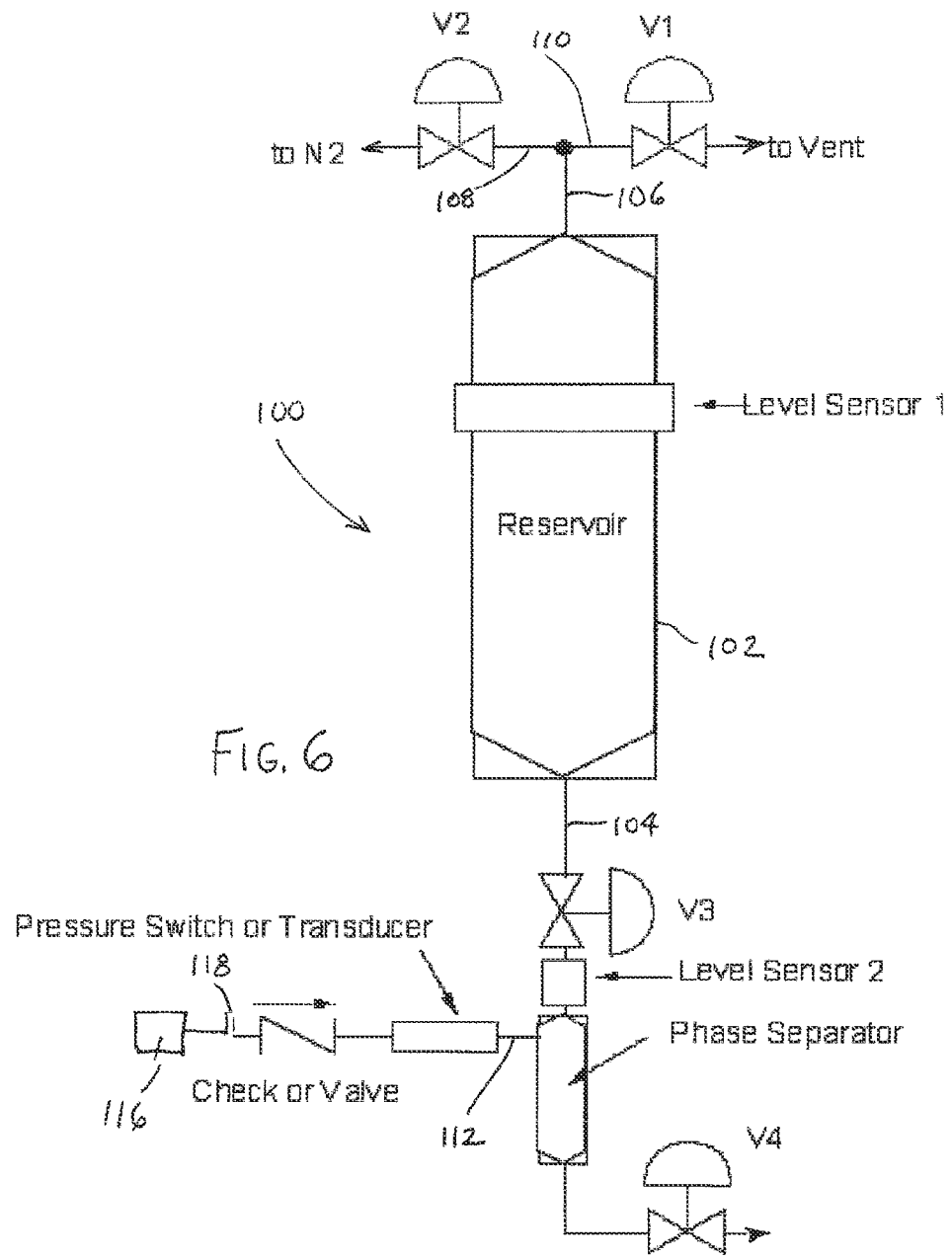
FIG. 6 is a schematic representation of a reservoir empty detect system according to another embodiment.

FIG. 6 is a schematic representation of a reservoir empty detect system according to another embodiment, and addresses the pressurization of the reservoir during normal dispense. The previously described barometric reservoir arrangements of FIGS. 3-5 leave the liquid medium in the reservoir under pressure for the whole dispense time. This liquid medium gets mixed into the lower reservoir and bubbles could be subsequently dispensed with the liquid medium. The FIG. 6 system stores the reserve liquid medium at atmospheric pressure in the reservoir.

The liner package and reservoir system 100 of FIG. 6 includes the liner package 116 as schematically shown coupled to the dispense line 118 containing check or valve upstream of a pressure switch or transducer. From the pressure switch or transducer, the liquid medium and headspace gas flows in line 112 to the phase separator, with the gases being vented through the check valve, phase separator, reservoir 102, and valves V3 and (if present) V1. When the liquid medium pushes up to Level Sensor 1, valve V3 is closed and the reserve amount of the liquid medium is saved.

The reservoir 102 has coupled thereto a gas discharge line 106 which in turn is joined to vent line 110 (to Vent) having valve V1 therein, and to branch line 108 (to N2) containing valve V2 therein. The reservoir 102 is positioned above the phase separator, and the phase separator at an upper portion thereof is coupled in fluid flow communication with the overlying reservoir by overhead line 104 having Level Sensor 2 and valve V3 therein. The phase separator in turn is coupled at a lower portion thereof to a liquid medium flow line containing valve V4 therein.

When the liner package is ready to dispense liquid medium to the downstream process, valve V4 is opened, and flow initiated. Errant bubbles are trapped by the Phase Separator, as the liquid medium continues to be dispensed. When the liner package 116 is empty, the pressure in the dispense line will drop and the pressure switch/transducer will be actuated. Valve V3 then will open, and liquid medium will be fed from the reservoir to the dispense train. When the liquid level drops to Level Sensor 2, valves V3 and V4 will close and the liner package 116 will then need to be changed.

Due to the presence of the check valve/valve in line 118, the liner package 116 can be taken offline when the Level Sensor 1 is actuated and the liner package changed out while the downstream process is fed from the reserve liquid medium in the reservoir.

Valves V1 and V2 are optional components of the system, which can simply be operated with the reservoir being open to atmospheric venting. Nonetheless, from a safety perspective and the objective of minimizing the evaporation of solvent, where the liquid medium is or contains volatile material, V1 is preferably used and is open during the filling of the reservoir. When the reservoir is filled to Level Sensor 1, V1 will close. Upon actuation of the pressure switch or transducer in line 118, indicating that the liner package is empty, valve V3 opens and valve V1 opens allowing reserve liquid medium to be used. Alternatively, if pressure dispensing is required, valve V2 will open instead of valve V1.

If valve V1 is used during the dispensing of liquid medium from the reservoir, there is the possibility that the pressure in a downstream pump will create bubbles from the resulting negative pressure condition. Pressurizing using valve V2 instead of valve V1 addresses such negative pressure issue. Dissolved gases may be present in the liquid medium coming from the reserve supply in the reservoir, but due to the short operational time involved, such effect should be minimal or absent.

Figure 7:
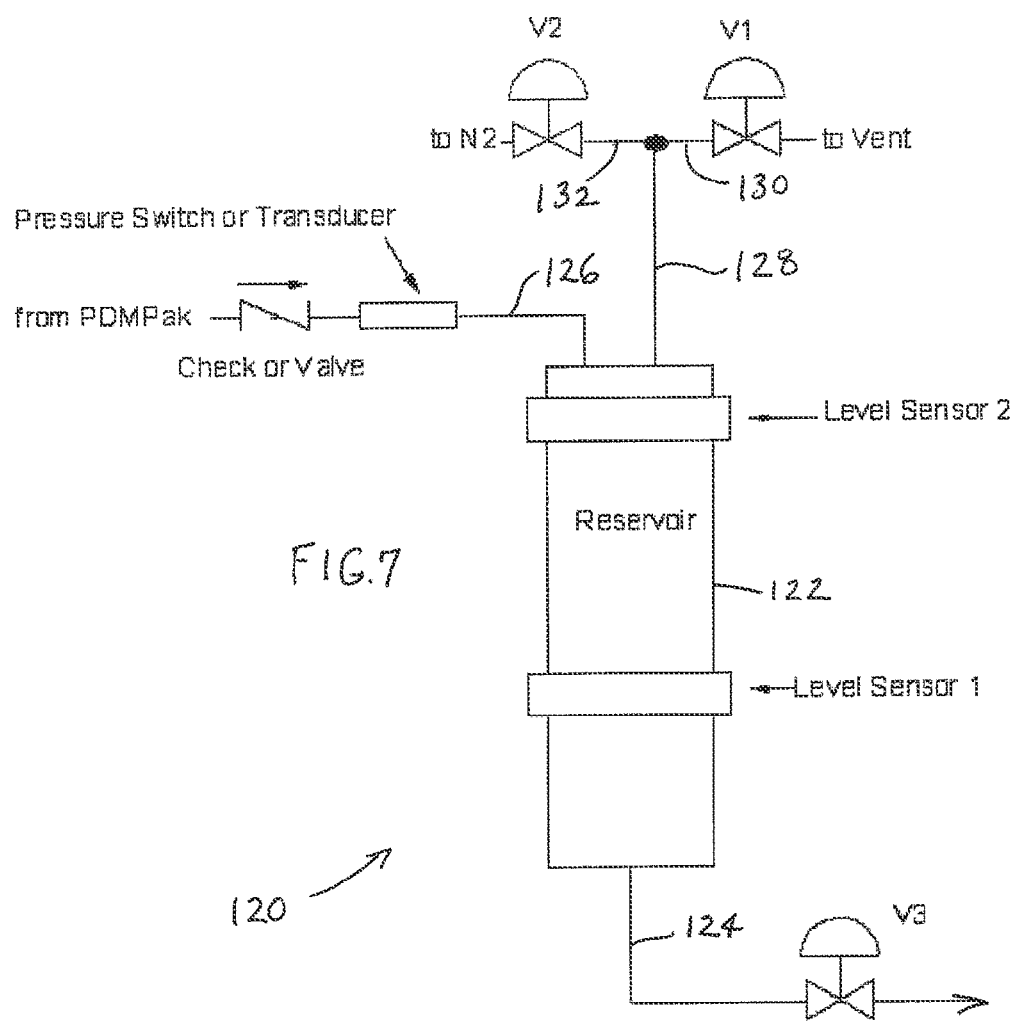
FIG. 7 is a schematic representation of a reservoir empty detect system according to yet another embodiment.

FIG. 7 is a schematic representation of a reservoir empty detect system according to yet another embodiment. The liner package is not shown in FIG. 7 but may comprise a liner package of a type commercially available from ATMI, Inc. (Danbury, Conn., USA) under the trademark PDMPak, which is coupled to the liquid medium feed line 126 ("from PDMPak"). Feed line 126 contains a Check or other type of Valve, and downstream of such valve is a Pressure Switch or Transducer.

The feed line 126 is coupled to a reservoir 122 having Level Sensor 2 at an upper portion thereof, and a Level Sensor 1 at a lower portion thereof. The lower portion of the reservoir is connected to a discharge line 124 having flow control valve V3 therein. At its upper end, the reservoir is coupled to line 128, which in turn is joined to branch line 130 containing valve V1 therein (to Vent), as well as to branch line 132 containing valve V2 therein (to N2).

At startup of the FIG. 7 system, the head space gas from the liner package is forced through the Check Valve/Valve up through the reservoir 122 and out lines 128 and 130, V1 being open. When liquid starts to flow to the reservoir, initiating fill thereof, the liquid level rises and when it reaches Level Sensor 2, valve V1 closes. The system then is ready to dispense to the downstream process facility, such as a microelectronic device manufacturing tool. It is to be noted that the Level Sensor 2 could alternatively be located in line 128, thereby allowing the reservoir to be completely full of chemical and further minimize gas entrainment. When the liner package reaches an empty condition, the pressure starts to decline, and such pressure drop actuates the Pressure Switch. The user has a choice to set the opening of either valve V1 or valve V2 at this stage of operation. If valve V1 is selected and is opened, then the pressure in the system will drop from the dispense pressure to atmospheric pressure. If valve V2 is selected and is opened, then the pressure in the reservoir will rise to the supply pressure of the nitrogen gas used in the system as a pressurizing gas for the liner package dispensing operation.

In the FIG. 7 system, the user has the ability to deliver liquid medium between Level Sensor 1 and Level Sensor 2.

When Level Sensor 1 is actuated, the liner package should be changed out and the dispense operation should be terminated.

The presence of the Check Valve in line 126 allows the user to remove and change out the liner package when Level Sensor 2 is actuated, thereby limiting the down time of the downstream liquid medium-utilizing process.

Figure 8:
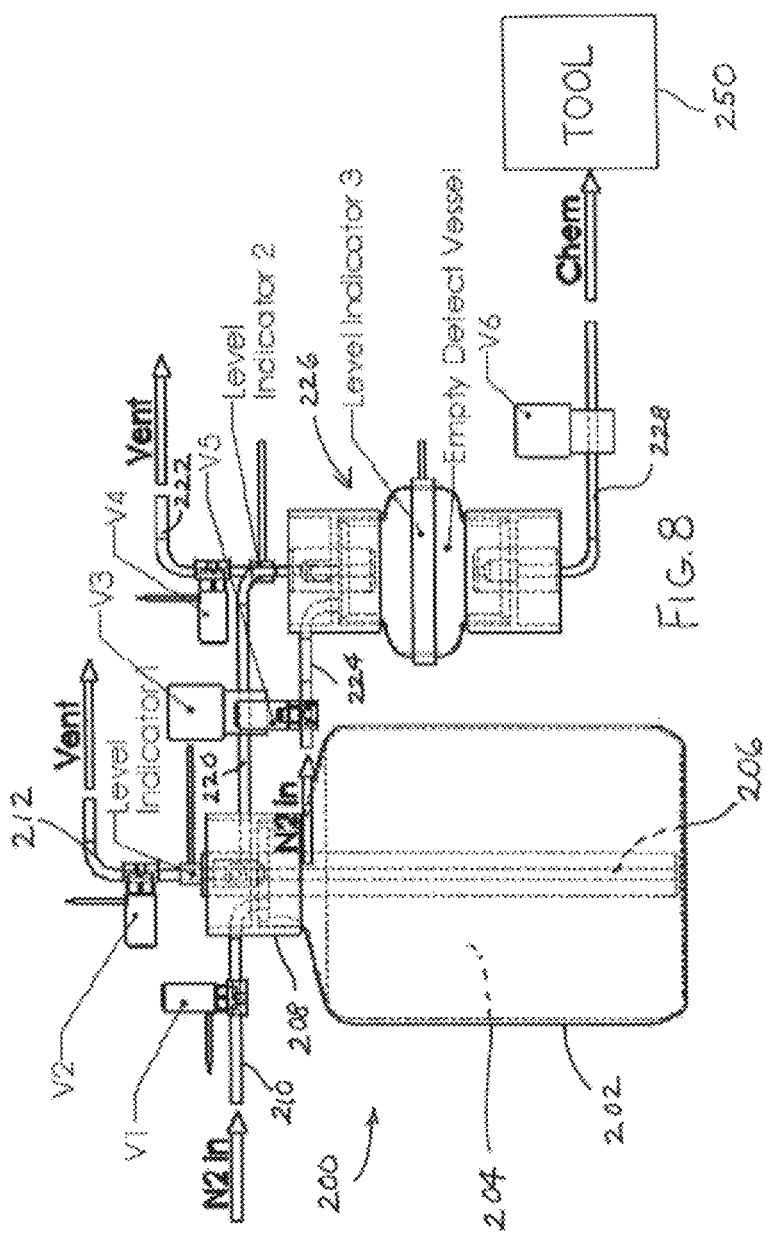
FIG. 8 is a schematic representation of a liner package and reservoir empty detect system in a specific embodiment.

FIG. 8 is a schematic representation of a liner package and reservoir empty or near empty detect system 200 in a specific embodiment. This embodiment allows for pressure dispensing and level detection without dispense gas (pressurizing gas) coming into contact with the liquid medium.

The FIG. 8 system uses a "bag/bellows in bottle" type liner package as the Empty Detect Vessel, and is arranged for empty detect monitoring of the liner package and pressure dispensing of reserve liquid medium to the downstream process facility, without the application of dispense gas directly to the liquid medium.

At startup of the FIG. 8 system, valves V1 and V2 open to vent gas from the head space of the liner package 200 comprising vessel 202 containing liner 204 and coupled via cap 208 with a dispensing assembly including dip tube 206. Pressurizing gas (N2) is introduced by pressurizing gas feed line 210 into the interior volume of vessel 202, to exert pressure on the liner therein, and effect pressure dispensing of liquid medium.

The liner package in the system of FIG. 8 can be of any suitable type. A vessel of the type commercially available from ATMI, Inc. (Danbury, Conn., USA) under the trademark NOWPAK, having a 4-liter liquid medium capacity, and a 3-port probe design, is illustratively shown.

When Level Indicator 1 senses liquid, valve V2 closes, which terminates flow of head space gas out of valve V2. Valves V3 and V4 then open, allowing liquid medium to enter the Empty Detect Vessel 226 via liquid medium transfer line 220. The Empty Detect Vessel is designed with a through port configuration that allows gas to escape through valve V4 and vent line 222.

Once Level Indicator 2 senses the presence of liquid (Level Indicator 3 being arranged for actuation prior to actuation of Level Indicator 2), valve V4 closes, thereby terminating the flow of liquid medium through such vent valve. After a short delay, valve V5 opens, thereby allowing the introduction of pressurizing gas (N2), to supply pressure to the interior volume of the Empty Detect Vessel. This supply pressure for the Empty Detect Vessel is set for slightly lower than the supply pressure applied to the interior volume of the liner package. By such arrangement, as long as liquid medium is in the liner package, liquid medium will be dispensed from the liner package, rather than from the Empty Detect Vessel 226.

Once the desired pressure is achieved by flow of pressurizing gas through valve V5, valve V6 opens to supply liquid medium in liquid medium discharge line 228 to the downstream process tool 250. The downstream process tool 250 can be of any suitable type, e.g., a microelectronic device manufacturing tool comprising a deposition chamber for deposition of photoresist on a semiconductor substrate, an ion implant tool for ion implantation of a semiconductor substrate, a chemical vapor deposition tool receiving an organometallic reagent for deposition of metal on a flat panel display substrate, etc. Eventually, the liquid medium in the liner package feeding the tool is fully consumed. When this occurs, the pressure inside the Empty Detect Vessel drops. The dispense pressure from nitrogen gas flowed through valve V5 takes over and continues the dispensing of liquid medium from the Empty Detect Vessel to the downstream process.

Level Indicator 3 is actuated when dispensing from the Empty Detect Vessel occurs, indicating that the liner package needs to be replaced. Valves V3 and V1 will close when Level Indicator 3 is actuated, thereby allowing the liner package to be changed safely while the downstream process is operating on the reserve liquid medium supply from the Empty Detect Vessel. The Empty Detect Vessel is designed to have a minimum liquid medium reserve, so that the Empty Detect Vessel can supply enough liquid medium for continued operation, e.g., in one specific embodiment, in a sufficient quantity to dispense microelectronic device manufacturing reagent to 2 boat loads of wafers (i.e., two lots of wafers (=50 wafers)). Once the liner package is changed out, the liquid medium dispensing process is repeated.

The Empty Detect Vessel can be configured and operated in any suitable manner. In one embodiment, the Empty Detect Vessel is constructed with a collapsible membrane that can be pressurized without applying direct pressure to the liquid medium, thus avoiding saturating the liquid medium with bubble-forming gas.

Other pressurizing structures that may be employed to avoid contacting the pressurizing gas with the liquid medium include bags, bellows, collapsible tubes, and the like.

Another alternative construction employs a tube, with a floating ball that allows for the pressurization of the Empty Detect Vessel, while simultaneously accommodating the separation of the pressurizing gas from the liquid medium. As a variation of this approach, a plunger or piston could be used to similar effect, in applications in which such moving parts can be accommodated without adverse effect on the desired purity requirements for the liquid being dispensed.

In yet another embodiment, the invention contemplates ultra-high purity packaging with integral sensors, to increase the functionality of the packaging, e.g., to improve the knowledge of the contents of packaging such as liner packages, during their storage, transport and subsequent use, as well as to link information from the packaging to centralized IT systems for factory automation/control, thereby achieving decreased cost-of-ownership and increased production efficiency, and enhancing cost accounting efficiency of packaging and packaged products.

Sensors used for such purpose may employ passive radio frequency identification (RFID) technology, the term passive denoting technology that uses no batteries for power, but instead uses RF power in the interrogating RF signal. Electrical power in this signal, which may also contain information, is received by an antenna. Simple circuitry processes the sensed electrical signal to rectify it, e.g., by diode circuitry, and to store it, e.g., by use of capacitive circuitry, so that after a suitable integration time the processed signal is available to wake up and operate the passive RFID chip.

Passive RFID, while useful for read-only or read-write non-volatile memory operations, in various packaging applications of the invention, can also be utilized in sensors, particularly if the sensed data density required is low enough to be satisfied by the power limitations in the passive approach. A variety of passive RFID protocols are available, including ISO 14443 (types A, B and C), operating at 13.56 MHz, and the EPC Gen-2, operating around 900 MHz.

Sensors useful in the broad practice of the present invention include, without limitation, liquid or solid level sensors, and sensors of material properties.

Level sensors can be of various types, including gravity sensors. When a bag-in-box package is utilized, such as the package commercially available from ATMI, Inc. (Danbury, Conn., USA) under the trademark NOWPAK, the liner walls are typically unsupported and the entire liner hangs freely from a dispense nozzle. In such conformation, the amount of stress and resulting mechanical deformation (strain) on the dispense nozzle physical supports can be measured by a sensor, to determine the amount of material left in the liner. This measurement can for example be a low-accuracy measurement, with ⅛ gradations of total liner volume, similar to an automobile fuel gauge, and with the sensor being zero-set at the factory. To improve sensitivity in specific embodiments of such sensor usage, the dispense nozzle could be fabricated from specific material at specific material thickness, on which a strain gauge can be mounted, to measure strain, e.g., using a Wheatstone bridge resistance array, with one or more of the legs fabricated to be strain-sensitive.

Since strain depends on temperature, a simultaneous temperature measurement can be conducted by a thermal sensor to correct for temperature effects. A combined strain-gauge/temperature sensor can be embodied as a battery powered, hardwired sensor, to determine the weight of material in the liner package, via deformation of the mounting flange in the dispense section of the package. A liner package level sensor of this type can also be hardwired for power and communication, and/or it can be adapted for wireless communication, with either battery power (e.g., as an active RFID) or with a passive RFID sensor. In instances where the sensor is placed on the disposable liner mounted on the dispense nozzle, such passive RFID scheme provides a low-cost, easily implemented material inventory sensor. Wireless sensors of this type can be implemented in an integrated manner with respect to antenna/reader components of materials tracking systems, or they may be independently implemented.

Alternatively, a strain sensor can be deployed on the tool (downstream process) side of the dispense nozzle, to measure the weight of the material-containing liner that is attached to the tool, using the same or similar hardware and hardwired (data and power) interfaces.

The invention contemplates usage of level sensors in bag-in-can or bag-in-bag liner packaging applications. In these cases removal of the liquid medium from the liner packaging can be achieved or assisted by pumping pressurized fluid (either gas or liquid) into the intermediate space inside the can or outer bag, to bear compressively on the exterior surface of the liner, so that the liner collapses and causes the liquid medium therein to be discharged. Since the outer containment vessel in such package arrangements has a fixed volume, the volume of the intermediate space (between the liner and the outer containment vessel) provides a direct indication of the amount of material left in the liner.

In one embodiment, the volume of this intermediate space is sensed by 1) temporarily closing the outlet or a downstream conducting line from the liner, 2) delivering a known quantity of gas into the intermediate space in the bag-in-can or the bag-in-bag package, and 3) measuring the pressure increase resulting from this incremental pulse of material into the intermediate space in the package. This sensor arrangement is preferably hardwired, with a module affixed to the outside of the outer containment vessel at the point of entry of the pressurizing fluid. This arrangement is particularly advantageous when there is a significant differential between the compressibility of the liner contents and the pressurizing fluid, e.g., between a liquid medium as the contained material in the liner, and a pressurizing gas.

With respect to materials property sensors, various properties of the liquid medium in the liner can be utilized for material property monitoring, in order to optimize the downstream process utilization of such liquid medium, to reject liquid medium that has become degraded, to salvage liquid medium beyond its nominal shelf life, to check and ensure accuracy of material packaging, etc.

In such applications, the materials property sensor can be of any suitable type, e.g., a hardwired microsensor, wireless battery-powered microsensor, or passive sensor integrated into the ultra-high purity disposable liner packaging, or in other disposable components of the product packaging.

Integration of passive RFID sensors directly into the liner packaging permits the accurate observation and tracking of material properties in an efficient and cost-effective manner.

The present invention in a specific aspect includes the use of fluid analysis sensors-on-a-chip that are integrated into the dispense nozzle or the liner packaging, e.g., via a hardwired power-data interface, to monitor a material in a high purity disposable package during use.

The invention therefore broadly contemplates the deployment in the packaging of sensors of various types, including for example (i) thermal sensors for monitoring equilibration of the product and its packaging after installation in a storage, transport or installation environment, (ii) electrochemical sensors for monitoring product shelf life, such as by analyzing organics or inorganic, or by-products formed in situ as a result of aging, environmental contamination, pH changes, gas permeation, etc., and (iii) optical scattering sensors, for monitoring homogeneity, mixing, and/or degree of mixing of product compositions in package product applications.

The invention additionally contemplates delivery systems for material using liner-based packages for pressure dispensing, and systems for material delivery in which exhaustion of a supply package is readily detected.

In one embodiment, the invention provides a material dispensing system including a material storage and dispensing package containing a liner therein, adapted to hold a material for pressure-dispensing thereof, wherein the package is coupled by a dispense line to a dispensed material-utilizing tool, and the dispense line has operatively disposed therein a servo-hydraulic dispense pump, and an empty detect pressure transducer between the package and the pump operatively arranged to provide an output indicative of approach to an empty state of the package.

The system may further include a reservoir gas separator and vent assembly disposed in the dispense line between the package and the servo-hydraulic dispense pump. Optionally, the system may also include a filter disposed in the dispense line between the reservoir gas separator and vent assembly and the pump, and an air-operated sequencing valve assembly (atmospheric valve/sequencing valve, or AV/SV, assembly) in the dispense line downstream of the pump.

The liner may suitably contain a chemical reagent, such as a photoresist or other material usefully employed for manufacture of microelectronic products, e.g., semiconductor devices and flat panel displays.

In the above-described system, the pressure transducer can be operatively coupled to a controller for isolating the package to enable change-out thereof on the approach to an empty state of the package.

Another embodiment of the invention relates to a material dispensing system including a material storage and dispensing package containing a liner therein, adapted to hold a material for pressure-dispensing thereof, wherein the package is coupled by a dispense line to a dispensed material-utilizing tool, and the dispense line is coupled to a dispenser arranged to receive resist on a cyclic replenishment schedule from said package, for flow to the tool, and a monitor adapted to detect an increase in time required for replenishment of the dispenser indicative of approach to an empty state of the package and to responsively provide an output of such approach.

The dispenser in such embodiment can include a pump, such as a pneumatic pump, a hydraulic pump, etc., wherein there is variation in elevation of different ones of the cups in the spin coat subsystem, and wherein the filling of the chamber of the dispenser (pump) assembly is elevation corrected. As used in such context, the term "cup" refers to a chamber (pump chamber) that has a wafer spinning position and is associated with a dispense arm and nozzle, spinner motor, and wafer chuck. The dispenser system can include a reservoir gas separator and vent assembly in a dispense line between the package and the dispenser. A filter may be provided in the dispense line between the reservoir gas separator and vent assembly and the dispenser, and an AV/SV valve assembly can be provided in the dispense line downstream of the dispenser. The AV/SV valve assembly includes an air-operated automatic valve (as the on/off AV portion of the assembly) and a suction-back valve (as the SV portion of the assembly), in which the SV portion reverse displaces volume so that the dispensed material is sucked up slightly into the nozzle, such that the meniscus does not drip on the wafer after coating.

The liner may suitably contain a chemical reagent, such as a photoresist or other material usefully employed for manufacture of microelectronic products, e.g., semiconductor devices and flat panel displays.

In the above-described system, the monitor can be operatively coupled to a controller for isolating the package to enable change-out thereof on the approach to an empty state of the package, and/or the monitor can be adapted for effecting other action in the system, such as a process control function.

In another aspect, the invention relates to a liner-based material storage and dispensing package for direct pressure-dispensing of material such as photoresist. The package is advantageously arranged for removal of headspace gas prior to dispensing, in order to achieve a zero or near-zero headspace condition, and thereby avoid generation of microbubbles in the packaged material to be dispensed.

By way of specific example, in semiconductor manufacturing facilities, such liner-based photoresist storage and dispensing package may be integrated with servo-hydraulic coupled dispense pumps for delivery of photoresist to the semiconductor wafer coating tool.

In dispensing systems of such type, the dispense pressure can be monitored by a transducer, and a progressively increasingly rapid drop in such pressure, as an empty condition of the dispensing vessel is approached, termed a "droop," can be used as a process parameter to determine when change-out of the supply package is necessary.

Figure 9:
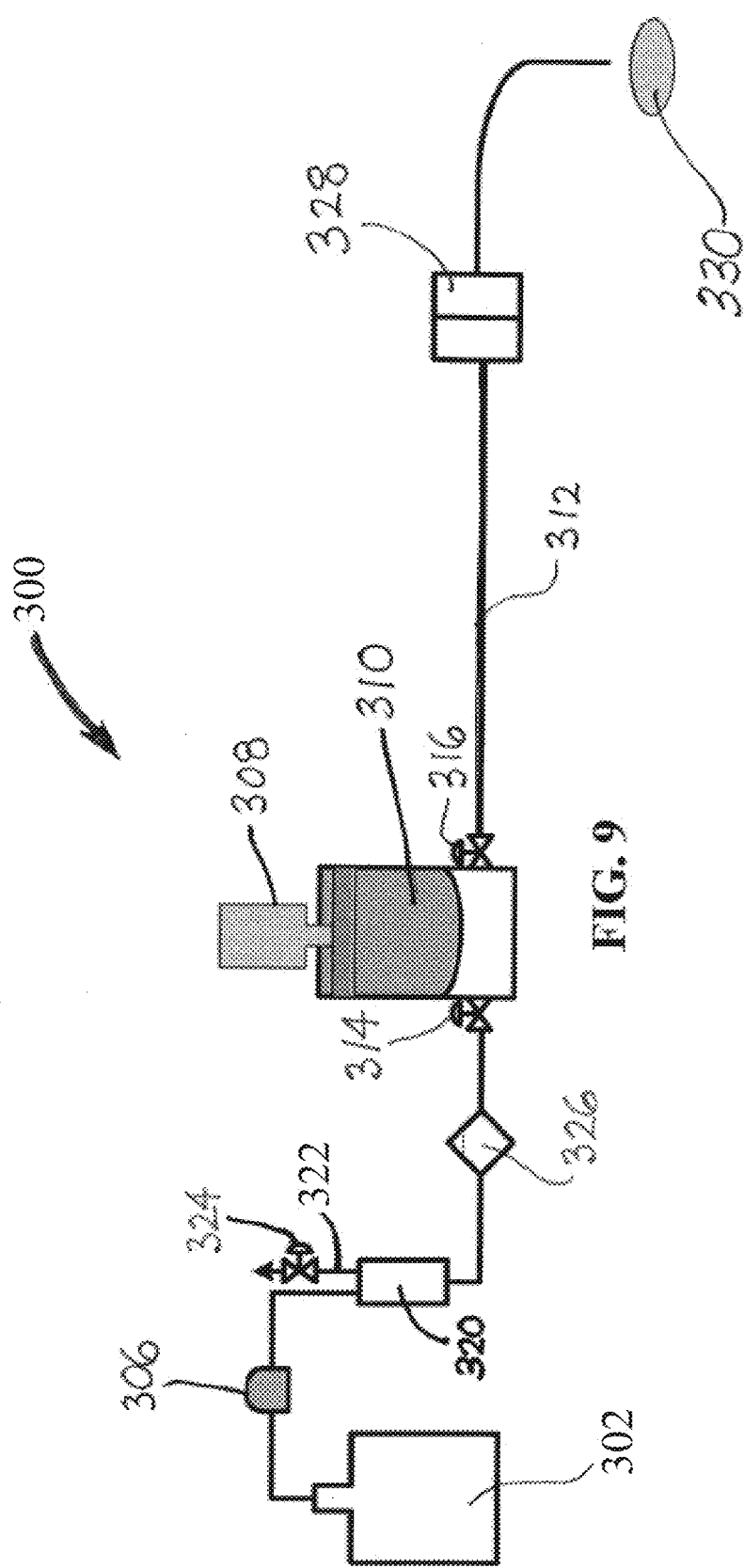
FIG. 9 is a schematic representation of a dispense system, including a liner-based pressure dispensing supply vessel integrated with a servo-hydraulic dispense pump and utilizing an empty detect pressure transducer, to determine the onset of pressure droop as an indicator of approach to an empty condition requiring change-out of the supply vessel.

A dispense system 300 of such type is schematically shown in FIG. 9, including a liner-based pressure dispensing supply vessel 302 integrated with a servo-hydraulic dispense pump including a servo piston motor 308 and a hydraulic fluid coupling 310. The system utilizes an empty detect pressure transducer 306, to determine the onset of pressure droop as an indicator of the approach-to-empty condition necessitating change-out of the supply vessel.

The servo-hydraulic dispense pump is disposed in the dispense line 312, being provided with an upstream flow control valve 314, and a downstream flow control valve 316. The dispense line 312 further contains a reservoir gas separator 320. A vent line 322 is coupled to the reservoir gas separator 320 and contains a flow control valve 324 therein, to accommodate the venting of the reservoir.

Downstream of the reservoir gas separator 320 is a filter 326. The filter is in turn positioned upstream of the servo-hydraulic dispense pump in the dispense line 312. Also disposed in the dispense line 312 is an air-operated sequencing valve 328 (atmospheric valve/sequencing valve, or AV/SV), as a valve tandem providing on/off back-suction to facilitate both dispensing and replenishment modes of operation in the delivery of the photoresist to the wafer 330.

Figure 10:
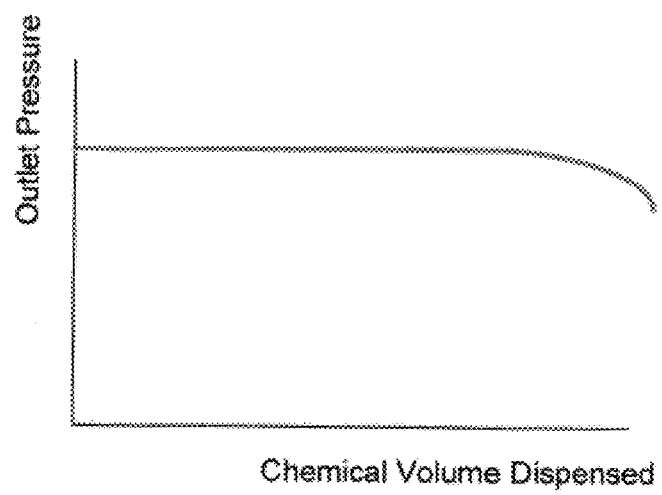
FIG. 10 is a qualitative graph of the supply package outlet pressure as a function of dispensed material volume, for a material delivery system according to one embodiment of the invention.

In the FIG. 9 system, the pump diaphragm in the servo-hydraulic dispense pump is the driver in both dispense and replenish modes. The time of the dispense and replenish is a pump operational parameter. Onset of the empty condition of the supply package 302 is detected by the transducer 306, and the empty condition is selected as a predetermined pressure droop as the empty condition is approached. A qualitative graph of the supply package outlet pressure as a function of dispensed material volume is set out in FIG. 10 hereof.

Although the above-described approach of utilizing an empty detect pressure transducer for determining onset of an empty condition in the photoresist supply vessel is in general reliable, transducers are relatively expensive, and do not monitor all aspects of the operational condition of the dispense train.

The invention therefore contemplates, in one embodiment thereof, the provision of a liner-based material storage and dispensing package for direct pressure-dispensing of material such as photoresist, integrated with a dispenser unit, e.g., of a type as described in U.S. Pat. No. 6,319,317 to Hideyuki Takamori, the disclosure which hereby is incorporated herein by reference, in its entirety.

Figure 11:
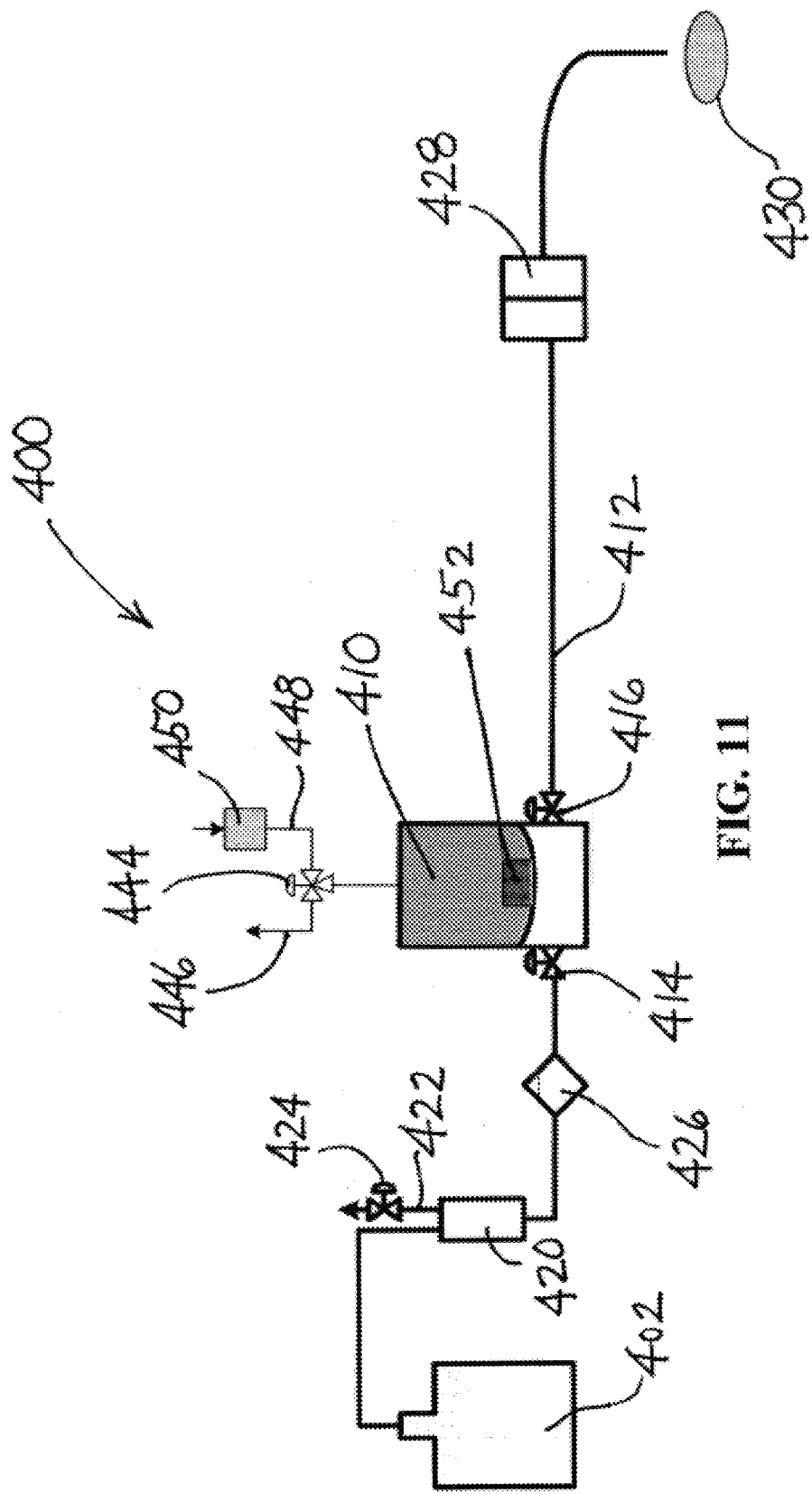
FIG. 11 is a schematic representation of a wafer coating system comprising a pressure dispense supply vessel having a dispense line interconnecting the package to a dispenser unit, according to another embodiment of the invention.

FIG. 11 is a schematic representation of a wafer coating system 400, comprising a pressure dispense supply vessel 402 having dispense line 412 coupled thereto. Disposed in the dispense line 412 is a dispenser (pump) unit including a pneumatic coupling section 410. The dispenser unit is coupled to a replenish vent line containing a three-way valve 444 therein, so that the dispenser unit can be vented through such valve, when it is in the open position, through discharge line 446. Also coupled to three-way valve 444, by feed line 448, is an electro-pneumatic regulator 450. The dispenser unit includes a replenish home position sensor 452.

The FIG. 11 system is otherwise configured as described in connection with FIG. 9 hereof, with a reservoir gas separator 420 in dispense line 412, coupled to vent line 422 having flow control valve 424 therein. The reservoir gas separator 420 is upstream of filter 426. The dispenser unit has respective upstream and downstream flow control valves 414 and 416 associated therewith, e.g., as integral components of the dispenser unit, and an AV/SV tandem valve 428 is disposed in dispense line 412, upstream of the wafer 430.

In the FIG. 11 system, the pump diaphragm is the driver only in the dispense operation. In the replenish mode, the pressure-dispensing package is the driver, and the dispenser diaphragm is a follower, with the replenish time being a function of the package pressure, resist viscosity, dispenser elevation with respect to the supply package, filter selection, dispenser dispense volume, filter loading, dispense line geometry and flow restrictions. The time required to replenish the dispenser unit is an early indication of the approach-to-empty condition of the supply vessel, in an inverse relationship to the empty-onset pressure droop.

Figure 12:
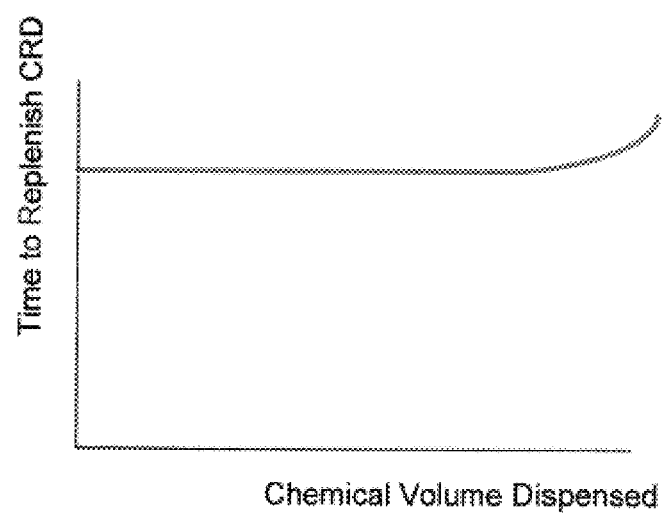
FIG. 12 is a qualitative graph of the relationship of the time-to-replenish for the dispenser unit (identified as "CRD") in a material delivery system of a type as shown in FIG. 11.

The empty condition is selected as a predetermined vessel time-to-replenish for each cup elevation of the wafer cup module of the resist coating unit ("COT"), with accompanying selection of the other parameters identified above. A qualitative graph of the relationship of the time-to-replenish for the dispenser unit is shown in FIG. 12.

The system arrangement shown in FIG. 11 avoids the need for an expensive pressure transducer and provides an indication of the character of the replenish operation.

Figure 13:
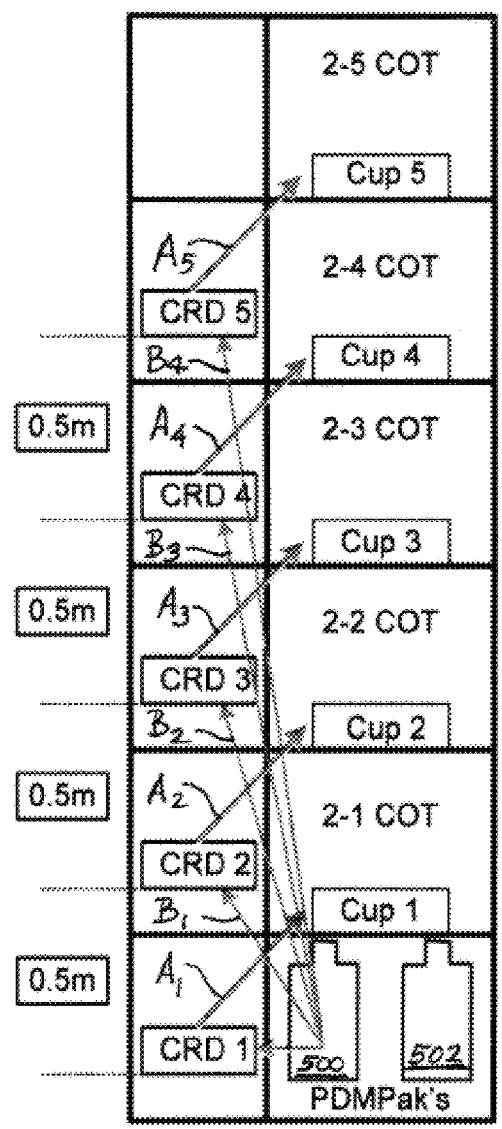
FIG. 13 is a schematic illustration of a COT (spin coat subsystem) module of a type as employed in the material delivery system of FIG. 11.

FIG. 13 is a schematic illustration of a COT module commercially available from Tokyo Electron Ltd. (Tokyo, Japan) under the trademark LITHIUS II, containing five wafer cups (Cup 1, Cup 2, Cup 3, Cup 4 and Cup 5). Each line $A_1$-$A_5$ on the COT module represents the constant dispense distance and elevation from the dispenser to the respective wafer cup. Each line $B_1$-$B_4$ represents the variable elevation as a function of the supply vessel to dispenser location. The COT module is shown as containing two pressure dispense packages 500 and 502, which are adapted to be used in sequence, so that as supply package 500 approaches exhaustion, it can be switched out, with fresh supply package 502, then being placed into dispensing service.

Each line $A_1$-$A_5$ represents a unique replenish time for the associated dispenser. As shown in the COT module elevation, each level represents 0.5 m (4.898 kPa, 0.710 psi) for a resist density of 1 g per milliliter.

Each COT module has a working drive pressure above the elevation, as a pressure that will linearly correlate under laminar flow conditions to the dispenser fill time. The ratio of replenish time to elevation-subtracted drive pressure was found to be a constant, thereby demonstrating the agreement of the empirical data to elevation-corrected drive potential. With all other factors being equal, e.g., filter loading, dispense line length, viscosity, filter selection, the dispenser's dispense volume to replenish, dispense line conformation, etc., the time to replenish is fixed at each cup level, and an increase in time reflects the onset of the supply vessel empty condition.

The end-of-dispense empty detect capability in the above-described system relies on the fact that for each cup level, the time-to-replenish will rise in proportion to the fraction of supply package pressure droop compared to the elevation-corrected drive pressure.

Figure 14:
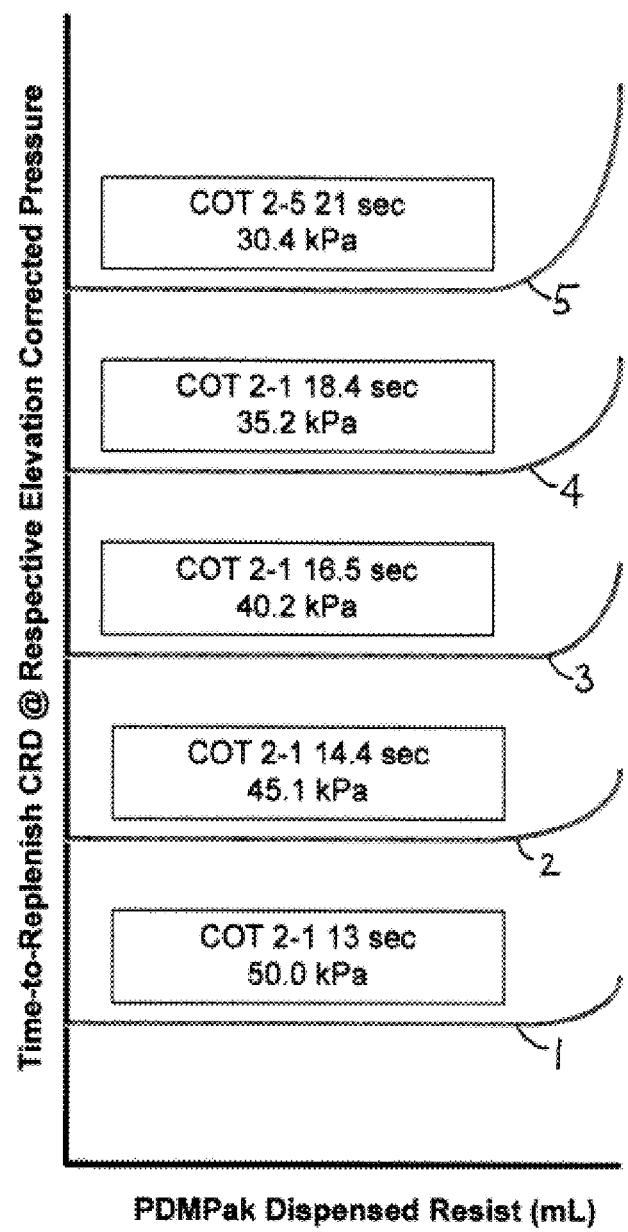
FIG. 14 is a graph of time-to-replenish dispenser at respective elevation-corrected pressures, as a function of the volume of dispensed resist material, in milliliters, for a COT module of the type as employed in the material delivery system of FIG. 11.

FIG. 14 is a graph of time-to-replenish dispenser at respective elevation-corrected pressures, as a function of the volume of dispensed resist material, in milliliters, for the COT module schematically illustrated in FIG. 13.

It is to be noted in the FIG. 14 graph that the replenish time ramps upwardly more quickly at higher cup elevations due to the supply package droop being larger percentage of elevation-corrected drive pressure under such conditions.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A fluid storage and dispensing system, comprising:
a vessel having an interior volume;
a liner in said interior volume, said liner arranged to contain a liquid medium;
a pressure assembly adapted to apply a pressure to the liner for pressure dispensing of the liquid medium from the liner;
a dispense line to dispense said liquid medium from the liner at a dispense line pressure, the dispense line being operatively coupled to at least one of the vessel and the liner; and
at least one pressure sensor arranged, detect a pressure drop in the dispense line during a dispensing operation; and
wherein the at least one pressure sensor is arranged to generate an output indicative of a near-empty-detect condition of the liner, wherein at least some liquid medium remains the liner, the output generated in response to a change in differential pressure between the exterior fluid pressure and the dispense line pressure when the pressure applied to the liner is increased responsive to the detected pressure drop to maintain a desired pressure in the dispense line.

2. The fluid storage and dispensing system of claim 1, wherein said at least one pressure sensor comprises a plurality of pressure sensors.

3. The fluid storage and dispensing system of claim 1, further comprising a controller adapted to receive said output from the at least one pressure sensor, and to responsively terminate the dispensing operation.

4. The fluid storage and dispensing system of claim 3, wherein the controller is adapted to effect change-over from said vessel and liner, to a second vessel and liner for continued dispensing operation.

5. The fluid storage and dispensing system of claim 1, wherein the pressure assembly includes a fluid pressurizing drive train adapted to deliver pressurized fluid into the interior volume to apply pressure on the liner.

6. The fluid storage and dispensing system of claim 1, wherein said liquid medium comprises a microelectronic device manufacturing reagent.

7. A microelectronic product manufacturing apparatus comprising a fluid storage and dispensing system according to claim 1, and a microelectronic product manufacturing tool coupled with the fluid storage and dispensing system to receive liquid medium dispensed through the dispense line.

8. A fluid storage and dispensing system, comprising:
a vessel having an interior volume;
a liner in said interior volume, said liner arranged to contain a liquid medium;
a dispensing assembly adapted to engage the vessel and to withdraw liquid medium from the liner during dispensing operation;
at least one pressure sensor arranged to monitor at least one condition indicative of withdrawal of said liquid medium from the liner during dispensing operation,
a dispense line operatively coupled to the dispensing assembly to dispense said liquid medium at a dispense line pressure; and
a drive train adapted to generate drive train pressure for applying pressure to the liner for pressure dispensing of the liquid medium from the liner;
wherein the at least one pressure sensor is arranged to generate an output in response to a change in said dispense line pressure indicative of the onset of exhaustion of liquid medium from the liner wherein at least some liquid remains in the liner, and said drive train is adapted to increase said drive train pressure responsive to said output so as to maintain a desired dispense line pressure.

9. The fluid storage and dispensing system of claim 8, wherein said at least one pressure sensor is arranged to generate an output correlative of an empty-detect condition upon occurrence of said empty-detect condition.

10. The fluid storage and dispensing system of claim 8, wherein said at least one pressure sensor is arranged to generate an output indicative of an empty-detect condition in response to the differential between said drive train pressure and said dispense line pressure.

11. The fluid storage and dispensing system of claim 10, further comprising a controller adapted to receive said output and to responsively terminate dispensing operation.

12. The fluid storage and dispensing system of claim 8, wherein the liner contains liquid medium in a zero or near zero headspace condition.

* * * * *